United States Patent

(12) United States Patent
Kohiyama

(10) Patent No.: US 9,152,773 B2
(45) Date of Patent: Oct. 6, 2015

(54) COMMUNICATION APPARATUS AND SECURE MODULE INCLUDING FUNCTION FOR DISABLING ENCRYPTED COMMUNICATION

(75) Inventor: Kiyoshi Kohiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 569 days.

(21) Appl. No.: 13/335,506

(22) Filed: Dec. 22, 2011

(65) Prior Publication Data

US 2012/0201380 A1 Aug. 9, 2012

(30) Foreign Application Priority Data

Feb. 8, 2011 (JP) ................. 2011-025497

(51) Int. Cl.
| G06F 11/30 | (2006.01) |
| G06F 12/14 | (2006.01) |
| H04K 1/00 | (2006.01) |
| G06F 21/12 | (2013.01) |
| G06F 21/14 | (2013.01) |
| G06F 21/52 | (2013.01) |
| G06F 21/57 | (2013.01) |
| G06F 21/51 | (2013.01) |
| H04L 29/06 | (2006.01) |
| G06F 21/64 | (2013.01) |

(52) U.S. Cl.
CPC ............ G06F 21/123 (2013.01); G06F 21/14 (2013.01); G06F 21/52 (2013.01); G06F 21/51 (2013.01); G06F 21/57 (2013.01); G06F 21/64 (2013.01); G06F 2221/2153 (2013.01); H04L 63/0428 (2013.01)

(58) Field of Classification Search
CPC ......... G06F 21/64; G06F 21/51; G06F 21/57; H04L 63/0428
USPC ...................... 380/255; 713/187, 193; 726/22
See application file for complete search history.

(56) References Cited

U.S. PATENT DOCUMENTS

| 7,913,094 B2 | 3/2011 | Kohiyama et al. | |
| 2003/0126457 A1 | 7/2003 | Kohiyama et al. | |
| 2004/0059934 A1 | 3/2004 | Kohiyama et al. | |
| 2004/0243810 A1* | 12/2004 | Rindborg et al. | ............. 713/176 |
| 2005/0120245 A1* | 6/2005 | Torisaki et al. | ............... 713/201 |

(Continued)

FOREIGN PATENT DOCUMENTS

| EP | 0 962 850 A2 | 12/1999 |
| EP | 1 387 238 A2 | 2/2004 |

(Continued)

OTHER PUBLICATIONS

European Search Report from EP App. No. 12150100.1 dated May 8, 2012.

(Continued)

*Primary Examiner* — Aravind Moorthy
(74) *Attorney, Agent, or Firm* — Arent Fox LLP

(57) ABSTRACT

A communication apparatus includes: a secure module; a first storage device, provided outside the secure module, to store a program for encrypted communication with an apparatus external to the communication apparatus using a cryptographic key stored in the secure module; a detecting unit, provided in the secure module, to detect tampering of the program; and a setting unit, provided in the secure module, to disable the encrypted communication when the tampering of the program is detected.

22 Claims, 33 Drawing Sheets

(56) References Cited

U.S. PATENT DOCUMENTS

| | | | |
|---|---|---|---|
| 2006/0272024 A1* | 11/2006 | Huang et al. | 726/26 |
| 2008/0044011 A1* | 2/2008 | Yoshida et al. | 380/28 |
| 2008/0072075 A1 | 3/2008 | Kohiyama et al. | |
| 2008/0072076 A1 | 3/2008 | Kohiyama et al. | |
| 2008/0072332 A1 | 3/2008 | Kohiyama et al. | |
| 2008/0126766 A1* | 5/2008 | Chheda et al. | 712/226 |
| 2009/0022315 A1* | 1/2009 | Leung | 380/255 |
| 2009/0129588 A1 | 5/2009 | Takakusu et al. | |
| 2009/0271790 A1* | 10/2009 | Williams | 718/100 |
| 2011/0078791 A1* | 3/2011 | Prakash et al. | 726/22 |

FOREIGN PATENT DOCUMENTS

| | | |
|---|---|---|
| JP | 2000-330872 A | 11/2000 |
| JP | 2003134102 A | 5/2003 |
| JP | 2003-198527 A | 7/2003 |
| JP | 2004-129227 A | 4/2004 |
| JP | 2007150965 A | 6/2007 |
| JP | 2007172653 A | 7/2007 |
| JP | 2008-118265 A | 5/2008 |

OTHER PUBLICATIONS

Cohen, "Operating System Protection Through Program Evolution", Computer & Security, vol. 12., No. 6,1993, pp. 565-584.

Falcarin et al, "Remote Trust with Aspect-Oriented Programming", Proceedings of the 20th International Conference on Advanced Information Networking and Applications (AINA'06), IEEE, 2006.

Aussel et al, "Smart Cards and remote entrusting", Future of Trust in Computing, Vieweg+Teubner 2009, pp. 38-45.

Japanese Office Action, dated Aug. 19, 2014, issued in Japanese Patent Application No. 2011-025497.

Japanese Office Action mailed Mar. 17, 2015 for Japanese Patent Application No. 2011-025497, with partial English Translation.

European Office Action mailed May 11, 2015 for corresponding European Patent Application No. 12 150 100.1.

* cited by examiner

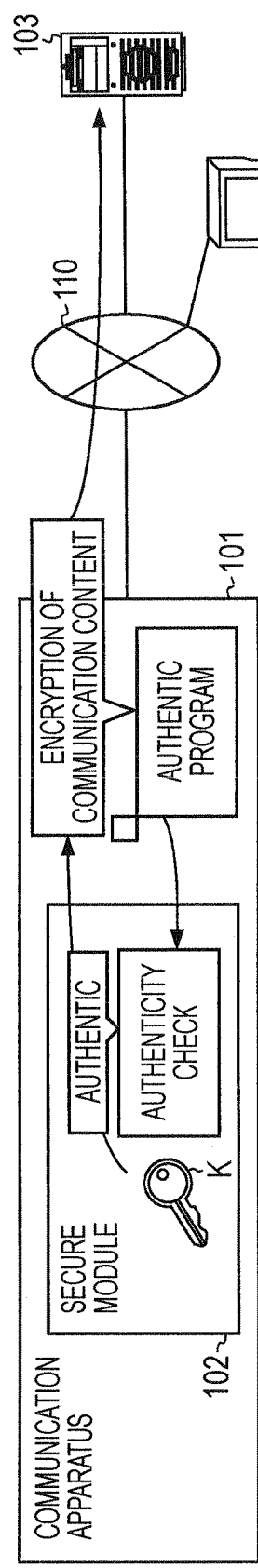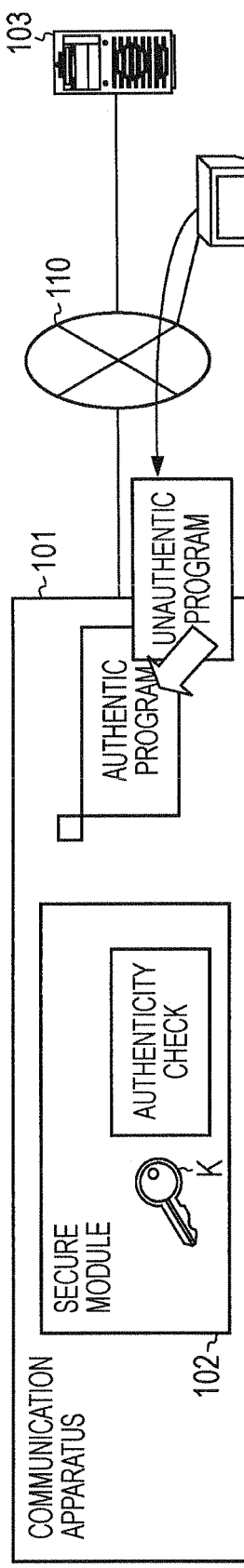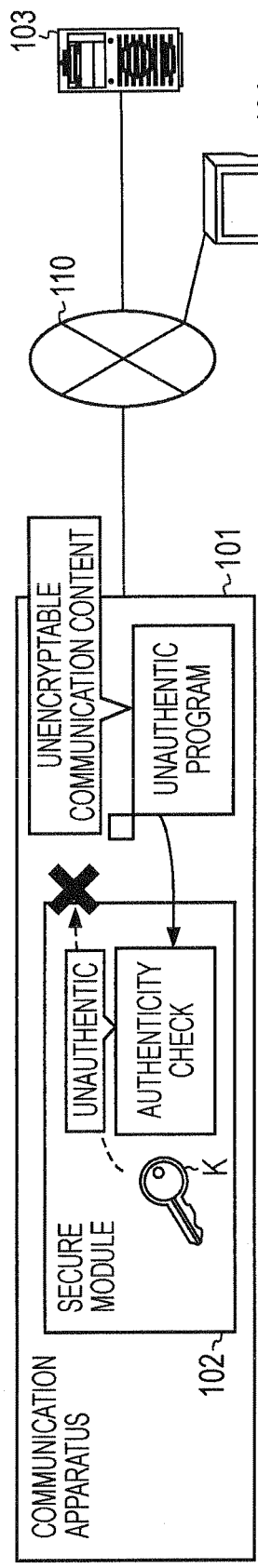

| ADDRESS | CONTENT |
|---|---|
| 1 | READ CONTENT AT MEMORY LOCATION 11 AND WRITE CONTENT TO MEMORY LOCATION 1001 |
| 2 | READ CONTENT AT MEMORY LOCATION 12 AND WRITE CONTENT TO MEMORY LOCATION 1002 |
| 3 | READ CONTENT AT MEMORY LOCATION 13 AND WRITE CONTENT TO MEMORY LOCATION 1003 |
| 4 | READ CONTENT AT MEMORY LOCATION 14 AND WRITE CONTENT TO MEMORY LOCATION 1004 |
| 5 | READ CONTENT AT MEMORY LOCATION 15 AND WRITE CONTENT TO MEMORY LOCATION 1005 |
| 6 | ADD CONTENTS AT MEMORY LOCATIONS 1001 TO 1005 |
| 7 | WRITE ADDITION RESULT AT ADDRESS 6 TO MEMORY LOCATION 1010 |
| 8 | ADD "+80" TO CONTENT AT MEMORY LOCATION 1010 AND APPLY "*5" TO ITS RESULT |
| 9 | WRITE CALCULATION RESULT AT ADDRESS 8 TO MEMORY LOCATION 1011 |
| 10 | REPORT CONTENT AT MEMORY LOCATION 1001 TO SECURE MODULE |

FIG. 10

| ADDRESS | CONTENT |
|---|---|
| 1 | READ CONTENT AT MEMORY LOCATION 21 AND WRITE CONTENT TO MEMORY LOCATION 1001 |
| 2 | READ CONTENT AT MEMORY LOCATION 22 AND WRITE CONTENT TO MEMORY LOCATION 1002 |
| 3 | READ CONTENT AT MEMORY LOCATION 23 AND WRITE CONTENT TO MEMORY LOCATION 1003 |
| 4 | READ CONTENT AT MEMORY LOCATION 24 AND WRITE CONTENT TO MEMORY LOCATION 1004 |
| 5 | READ CONTENT AT MEMORY LOCATION 25 AND WRITE CONTENT TO MEMORY LOCATION 1005 |
| 6 | ADD CONTENTS AT MEMORY LOCATIONS 1001 TO 1005 |
| 7 | WRITE ADDITION RESULT AT ADDRESS 6 TO MEMORY LOCATION 1010 |
| 8 | ADD "+80" TO CONTENT AT MEMORY LOCATION 1010 AND APPLY "*5" TO ITS RESULT |
| 9 | WRITE CALCULATION RESULT AT ADDRESS 8 TO MEMORY LOCATION 1011 |
| 10 | REPORT CONTENT AT MEMORY LOCATION 1001 TO SECURE MODULE |

| ADDRESS | CONTENT |
|---|---|
| 1 | READ CONTENT AT MEMORY LOCATION 12 AND WRITE CONTENT TO MEMORY LOCATION 1001 |
| 2 | READ CONTENT AT MEMORY LOCATION 11 AND WRITE CONTENT TO MEMORY LOCATION 1002 |
| 3 | READ CONTENT AT MEMORY LOCATION 15 AND WRITE CONTENT TO MEMORY LOCATION 1003 |
| 4 | READ CONTENT AT MEMORY LOCATION 14 AND WRITE CONTENT TO MEMORY LOCATION 1004 |
| 5 | READ CONTENT AT MEMORY LOCATION 13 AND WRITE CONTENT TO MEMORY LOCATION 1005 |
| 6 | ADD RESULT OBTAINED BY ADDING "+1" TO CONTENT AT MEMORY LOCATION 1001, RESULT OBTAINED BY APPLYING "*3" TO CONTENT AT MEMORY LOCATION 1002, RESULT OBTAINED BY ADDING "+5" TO CONTENT AT MEMORY LOCATION 1003, RESULT OBTAINED BY PERFORMING LOGICAL ADDITION OF CONTENT AT MEMORY LOCATION 1004 AND VALUE "0110", AND CONTENT AT MEMORY LOCATION 1005 |
| 7 | WRITE ADDITION RESULT AT ADDRESS 6 TO MEMORY LOCATION 1010 |
| 8 | ADD "+80" TO CONTENT AT MEMORY LOCATION 1010 AND APPLY "*5" TO ITS RESULT |
| 9 | WRITE CALCULATION RESULT AT ADDRESS 8 TO MEMORY LOCATION 1011 |
| 10 | REPORT CONTENT AT MEMORY LOCATION 1001 TO SECURE MODULE |

| ADDRESS | CONTENT |
|---|---|
| 1 | READ CONTENT AT MEMORY LOCATION 12, ADD MEMORY LOCATION NUMBER OF SCANNING PROGRAM, AND WRITE ITS RESULT TO MEMORY LOCATION 1001 |
| 2 | READ CONTENT AT MEMORY LOCATION 11, ADD MEMORY LOCATION NUMBER OF SCANNING PROGRAM, AND WRITE ITS RESULT TO MEMORY LOCATION 1002 |
| 3 | READ CONTENT AT MEMORY LOCATION 15, ADD MEMORY LOCATION NUMBER OF SCANNING PROGRAM, AND WRITE ITS RESULT TO MEMORY LOCATION 1003 |
| 4 | READ CONTENT AT MEMORY LOCATION 14, ADD MEMORY LOCATION NUMBER OF SCANNING PROGRAM, AND WRITE ITS RESULT TO MEMORY LOCATION 1004 |
| 5 | READ CONTENT AT MEMORY LOCATION 13, ADD MEMORY LOCATION NUMBER OF SCANNING PROGRAM, AND WRITE ITS RESULT TO MEMORY LOCATION 1005 |
| 6 | ADD RESULT OBTAINED BY ADDING "+1" TO CONTENT AT MEMORY LOCATION 1001, RESULT OBTAINED BY APPLYING "*3" TO CONTENT AT MEMORY LOCATION 1002, RESULT OBTAINED BY ADDING "+5" TO CONTENT AT MEMORY LOCATION 1003, RESULT OBTAINED BY PERFORMING LOGICAL ADDITION OF CONTENT AT MEMORY LOCATION 1004 AND VALUE "0110", AND CONTENT AT MEMORY LOCATION 1005 |
| 7 | WRITE ADDITION RESULT AT ADDRESS 6 TO MEMORY LOCATION 1010 |
| 8 | ADD "+80" TO CONTENT AT MEMORY LOCATION 1010 AND APPLY "*5" TO ITS RESULT |
| 9 | WRITE CALCULATION RESULT AT ADDRESS 8 TO MEMORY LOCATION 1011 |
| 10 | REPORT CONTENT AT MEMORY LOCATION 1001 TO SECURE MODULE |

PRE-MODIFICATION TARGET PROGRAM

| ADDRESS | CONTENT |
|---|---|
| 1 | X = 1+5 |
| 2 | Y = X+8 |
| 3 | Z = X+Y |
| 4 | Y = Y+1 |
| 5 | Z = Z+1 |
| 6 | Z = 5+Z |
| 7 | Y = 7+5 |
| ... | ... |

TABLE

| ADDRESS | KEY |
|---|---|
| 4 | K1 |
| 7 | K2 |
| 10 | K3 |
| 13 | K4 |

MODIFIED TARGET PROGRAM (BEFORE DECRYPTION)

| ADDRESS | CONTENT |
|---|---|
| 1 | X = 1+5 |
| 2 | Y = X+8 |
| 3 | Z = X+Y |
| 4 | READ |
| 5 | DECRYPT INSTRUCTION AT ADDRESS 6 AND RETURN RESULT TO ADDRESS 6 |
| 6 | E1 (Y = Y+1) |
| 7 | READ |
| 8 | DECRYPT INSTRUCTION AT ADDRESS 9 AND RETURN RESULT TO ADDRESS 9 |
| 9 | E2 (Z = Z+1) |
| 10 | READ |
| 11 | DECRYPT INSTRUCTION AT ADDRESS 12 AND RETURN RESULT TO ADDRESS 12 |
| 12 | E3 (Z = 5+Z) |
| 13 | READ |
| 14 | DECRYPT INSTRUCTION AT ADDRESS 15 AND RETURN RESULT TO ADDRESS 15 |
| 15 | E4 (Y = 7+5) |
| ... | ... |

MODIFIED TARGET PROGRAM (AFTER DECRYPTION)

| ADDRESS | CONTENT |
|---|---|
| 1 | X = 1+5 |
| 2 | Y = X+8 |
| 3 | Z = X+Y |
| 4 | READ |
| 5 | DECRYPT INSTRUCTION AT ADDRESS 6 AND RETURN RESULT TO ADDRESS 6 |
| 6 | Y = Y+1 |
| 7 | READ |
| 8 | DECRYPT INSTRUCTION AT ADDRESS 9 AND RETURN RESULT TO ADDRESS 9 |
| 9 | Z = Z+1 |
| 10 | READ |
| 11 | DECRYPT INSTRUCTION AT ADDRESS 12 AND RETURN RESULT TO ADDRESS 12 |
| 12 | Z = 5+Z |
| 13 | READ |
| 14 | DECRYPT INSTRUCTION AT ADDRESS 15 AND RETURN RESULT TO ADDRESS 15 |
| 15 | Y = 7+5 |
| ... | ... |

HDD / SECURE MODULE / MEMORY (SCAN-TARGET REGION)

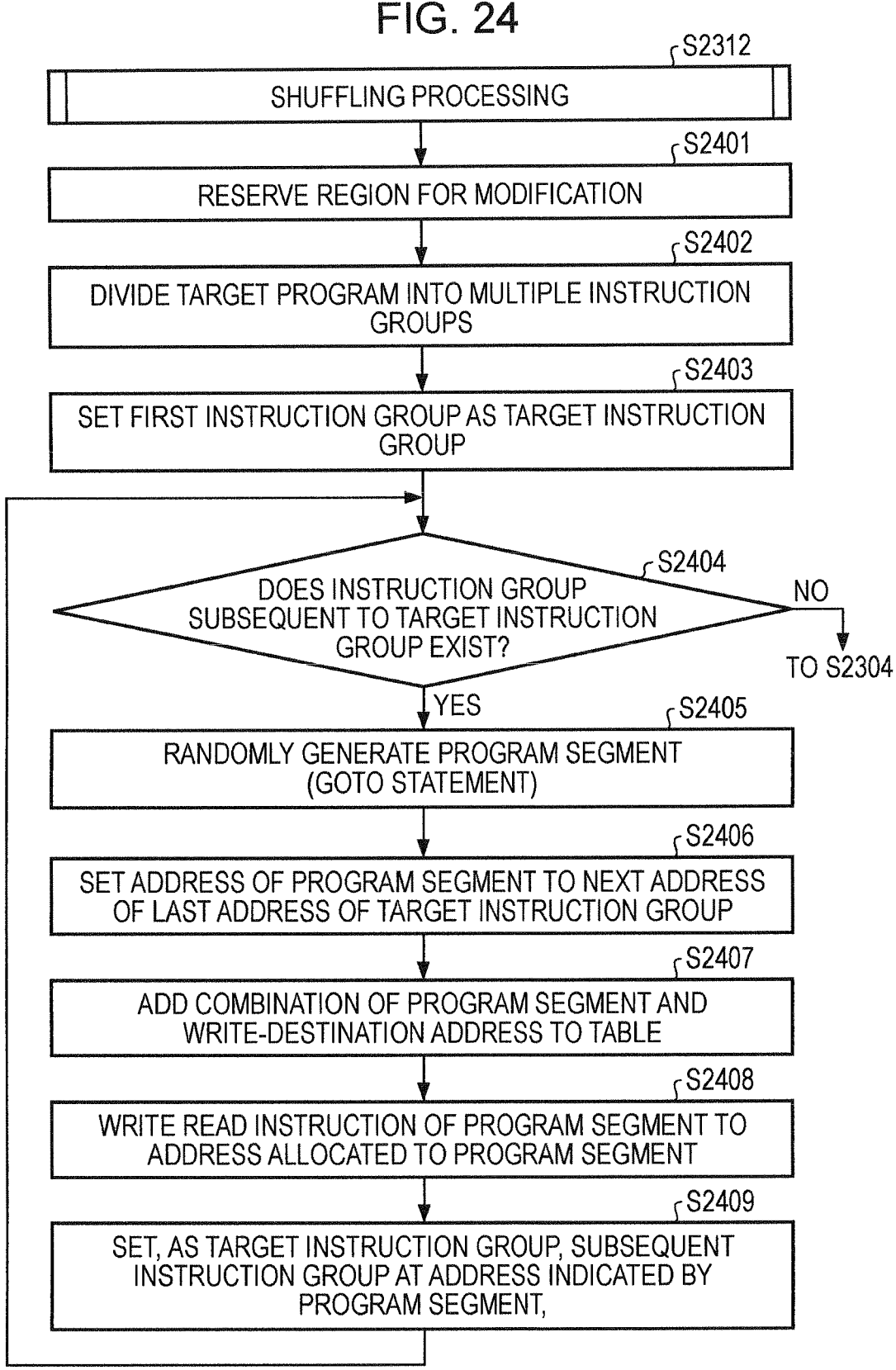

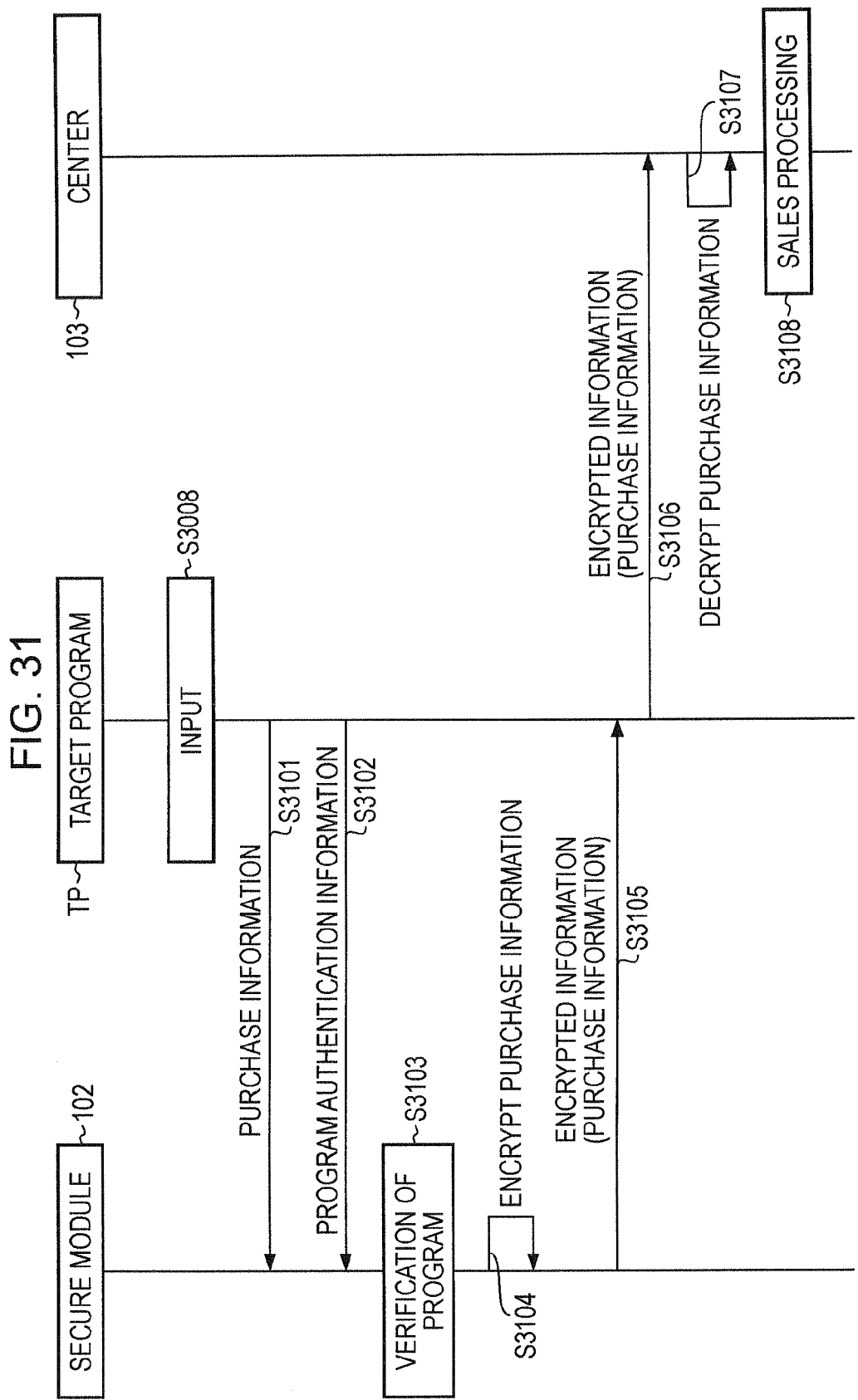

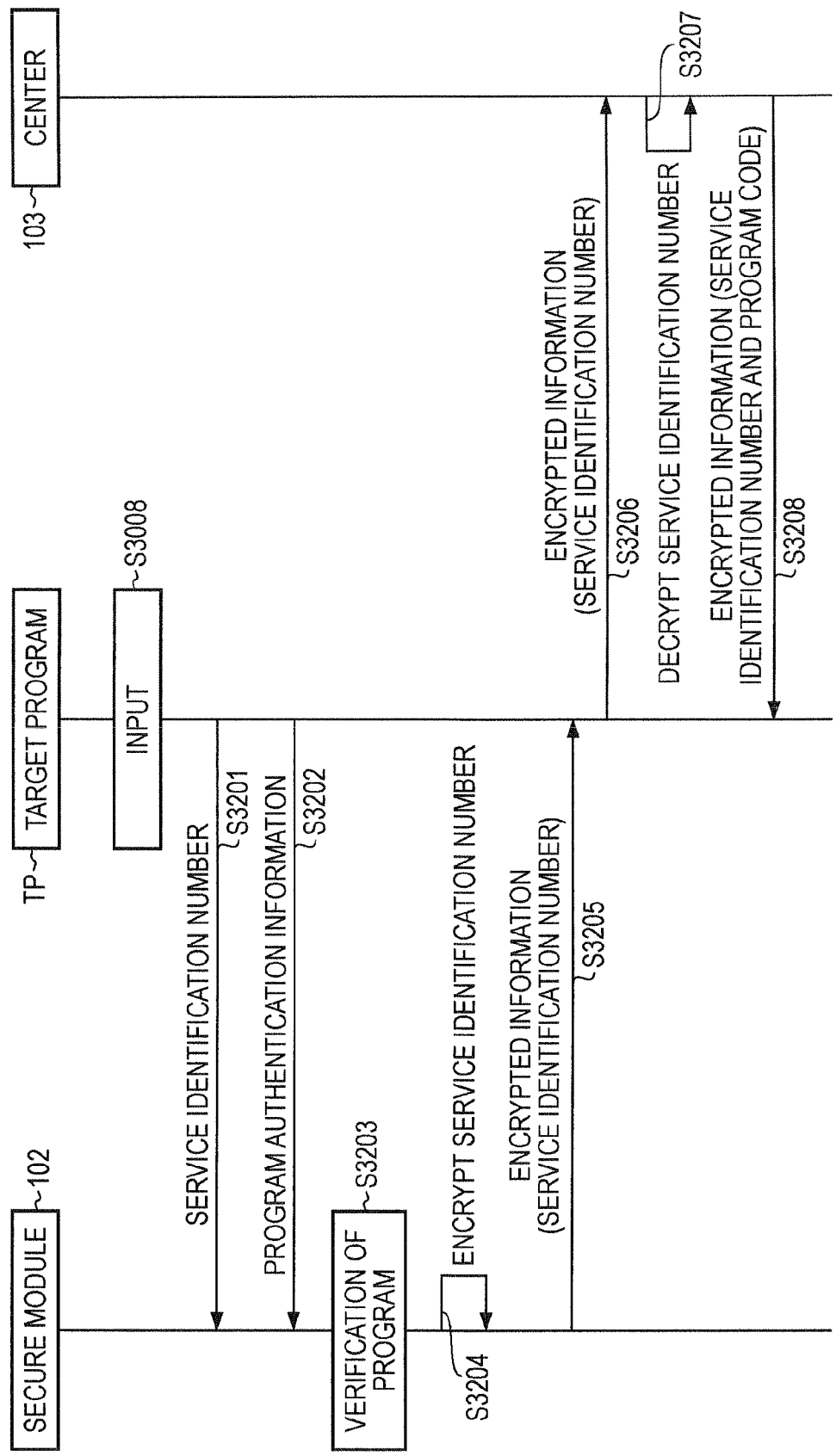

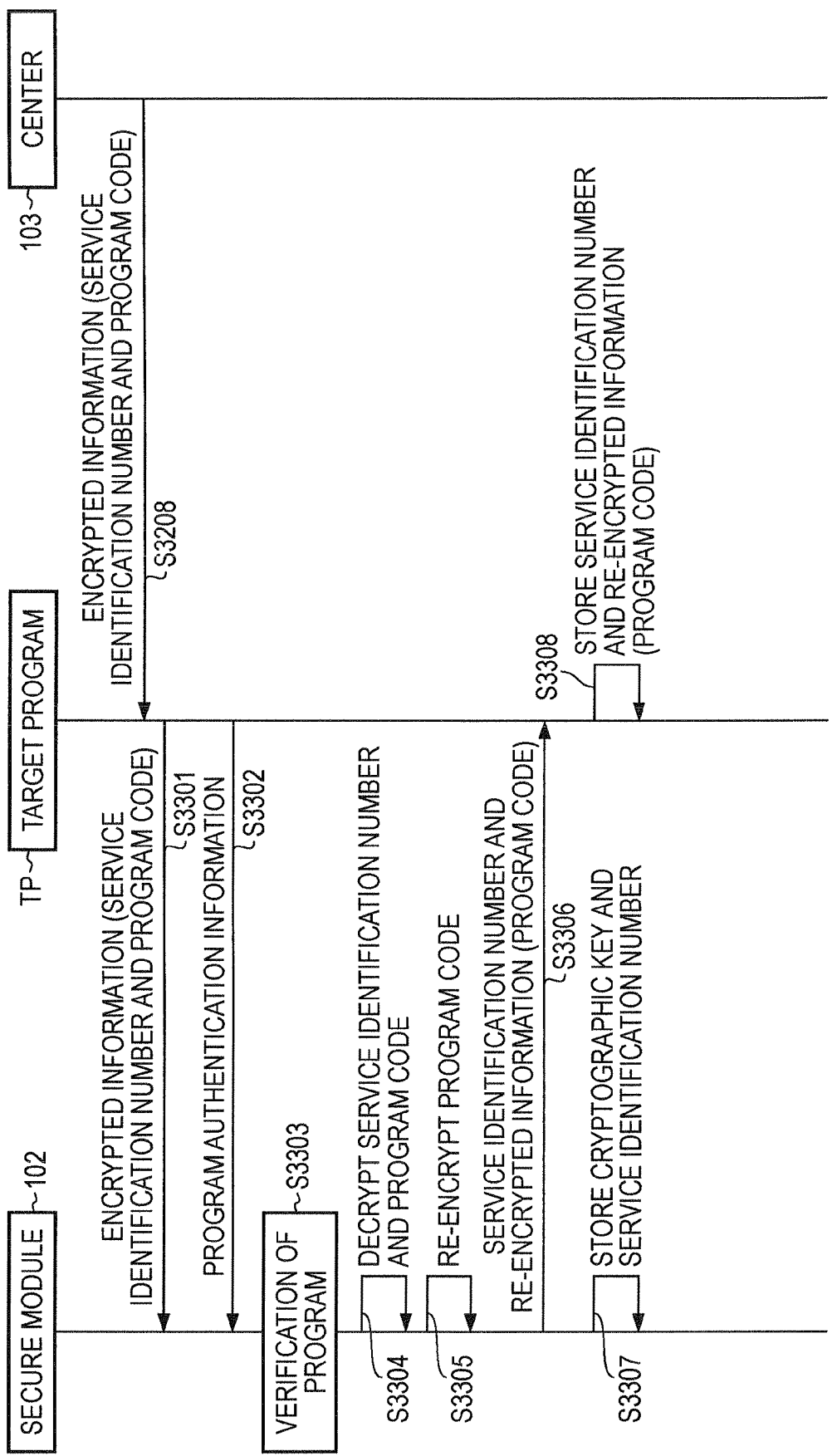

COMMUNICATION APPARATUS AND SECURE MODULE INCLUDING FUNCTION FOR DISABLING ENCRYPTED COMMUNICATION

CROSS-REFERENCE TO RELATED APPLICATIONS

This application claims the benefit of priority from Japanese Patent Application No. 2011-25497 filed on Feb. 8, 2011, the entire contents of which are incorporated herein by reference.

FIELD

Embodiments disclosed herein relate to a communication apparatus and a secure module.

BACKGROUND

Specifications and software structures of terminals, for example, mobile terminals, are kept secret. The security of confidential information, for example, authentic cryptographic keys, may be ensured using secure modules (e.g., tamper-resistant modules) whose integrity is ensured. One example of the secure modules is a subscriber identity module (SIM) card.

For example, for communication with a terminal, an external apparatus determines whether or not received communication content is encrypted with an authentic cryptographic key whose integrity is ensured, thereby determining whether or not the communication content is authentic.

Related art is disclosed in Japanese Laid-open Patent Publication No. 2004-129227 and Japanese Patent No. 4408601.

SUMMARY

According to one embodiment, a communication apparatus includes: a secure module; a first storage device, provided outside the secure module, to store a program for encrypted communication with an apparatus external to the communication apparatus using a cryptographic key stored in the secure module; a detecting unit, provided in the secure module, to detect tampering of the program; and a setting unit, provided in the secure module, to disable the encrypted communication when the tampering of the program is detected.

Additional advantages and novel features of the invention will be set forth in part in the description that follows, and in part will become more apparent to those skilled in the art upon examination of the following or upon learning by practice of the invention.

BRIEF DESCRIPTION OF THE DRAWINGS

FIGS. 1A, 1B, and 1C each illustrate an exemplary communication;
FIG. 9 illustrates an exemplary scanning program;
FIG. 10 illustrates an exemplary scanning program;
FIG. 11 illustrates an exemplary scanning program;
FIG. 12 illustrates an exemplary the scanning program;
FIG. 21 illustrates an exemplary program modification;
FIG. 24 illustrates an exemplary shuffling process;
FIG. 31 illustrates an exemplary sequence of encrypted communication;
FIG. 32 illustrates an exemplary sequence of encrypted communication;
and
FIG. 33 illustrates an exemplary encrypted communication.

DESCRIPTION OF EMBODIMENTS

Figure 2:
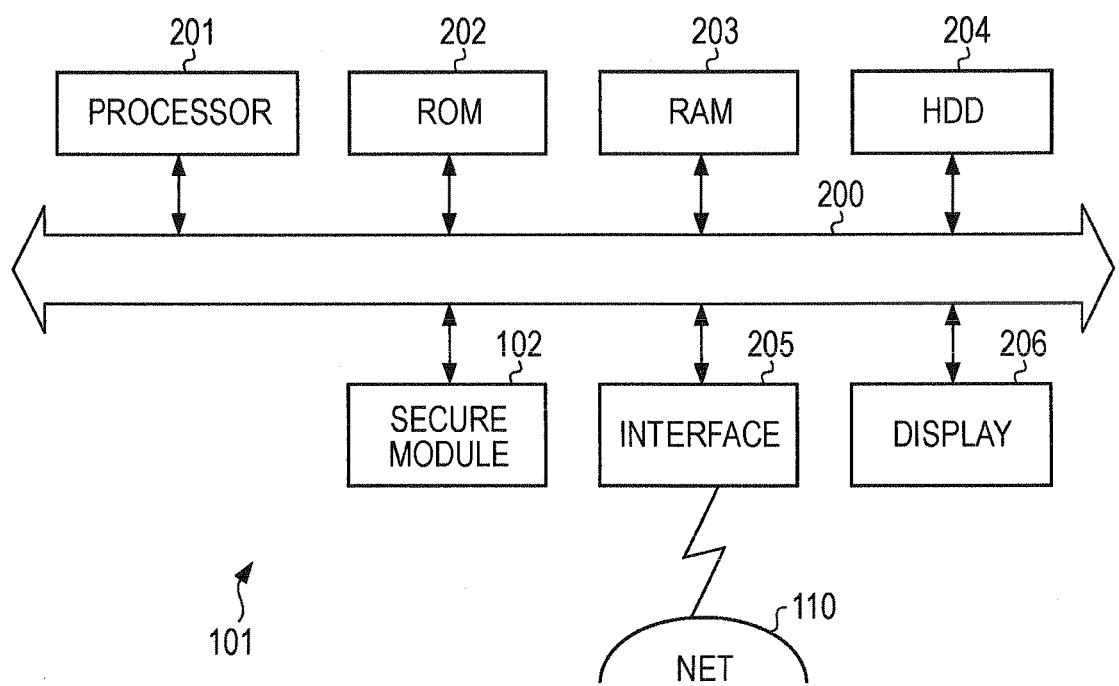
FIG. 2 illustrates an exemplary communication apparatus.

For example, since the specifications or software structures of smart phone terminals may be disclosed to the public, the software in the terminals may be analyzed and tampered with. Since interfaces using the software are also disclosed to the public, confidential information in secure modules whose internal structures are not tampered with may be read using unauthentic software.

Since the unauthentic software may transmit fake communication content, encrypted using an authentic cryptographic key, to an external apparatus, the external apparatus may not be able to determine the authenticity of the communication content.

FIGS. 1A to 1C illustrate an exemplary communication. Communication may be performed between a communication apparatus and a center. A communication apparatus 101 illustrated in each of FIGS. 1A to 1C includes a secure module 102. The communication apparatus 101 may also include a program (e.g., an encrypted communication program) for performing encrypted communication by using a cryptographic key (e.g., a cryptographic key K) in the secure module 102. In the encrypted communication, the communication content is encrypted. For example, in the encrypted communication program, a communication content to be transmitted is encrypted using a cryptographic key K or a received communication content is decrypted using a cryptographic key K. The key for the encryption and the key for the decryption may be different from each other.

Using the encrypted communication program, the communication apparatus 101 performs encrypted communication with an external apparatus, for example, the center 103, through a network 110. The encrypted communication program may include, for example, a book-ordering software, a electronic-book-ordering software, or a electronic-money receiving software. The communication apparatus 101 may be coupled to a cracker's computer 104 through the network 110.

The secure module 102 may have a structure that protects internal information from being externally referred to. One example of such a structure is a large scale integration (LSI) having a tamper resistant module structure (TRM structure). Such a structure may reduce snooping on the secure module 102 or may reduce tampering with the data in the secure module 102.

The secure module 102 may hold the authentic cryptographic key K. A decryption key corresponding to the cryptographic key K may be the cryptographic key K. When the cryptographic key K and the decryption key are different from each other, the secure module 102 may hold the decryption key. The secure module 102 may hold a decryption key corresponding to a cryptographic key of the center 103 to which the communication is performed.

The secure module 102 may monitor whether a program, for example, a target program TP, is an authentic program or a tampered, unauthentic program periodically. The target program TP may be the encrypted communication program in the communication apparatus 101.

Upon determining that the target program TP is an authentic program, the secure module 102 supplies, to the target program TP, the cryptographic key K for encrypting communication content. Upon determining that the target program TP is an unauthentic program, the secure module 102 is put into a state in which the target program TP in the communication apparatus 101 cannot perform encrypted communication by using the cryptographic key K.

When the state in which the encrypted communication cannot be performed using the cryptographic key K is established, for example, the secure module 102 may reject a cryptographic-key K read request or a communication-content encryption request issued from the unauthentic program. For example, the function of the secure module 102 may be stopped until restarting. Alternatively, the secure module 102 may send a request for stopping the unauthentic program to the communication apparatus 101 to terminate the unauthentic program.

The center 103 may perform encrypted communication with the communication apparatus 101. The center 103 may hold a decryption key corresponding to the cryptographic key K in the center 102. For example, when the cryptographic key K in the secure module 102 is a secret key, the decryption key at the center 103 may be a public key of the secure module 102. For example, the cryptographic key K in the secure module 102 and the decryption key at the center 103 may be implemented by a common key.

The center 103 may determine whether or not the received content is encrypted with the cryptographic key K, to determine whether or not the communication content is authentic. For example, when the center 103 properly decrypts the received content by using the decryption key corresponding to the cryptographic key K, the center 103 may determine that the received content is authentic communication content.

As illustrated in FIG. 1A, when an authentic program runs properly in the communication apparatus 101, the secure module 102 may determine that a target program TP is an authentic program. The secure module 102 may supply, to the authentic program, the cryptographic key K for encrypting corresponding communication content. The authentic program may encrypt the communication content by using the authentic cryptographic key K and may transmit the encrypted content to the center 103.

Based on whether or not the communication content is encrypted with the authentic cryptographic key K, the center 103 checks the communication content. For example, when the center 103 properly decrypts the communication content by using the decryption key corresponding to the cryptographic key K, the center 103 may determine that the received content is authentic. Based on the received communication content, for example, a user at the center 103 may send a book to a user of the communication apparatus 101 or may charge a fee for the book.

As illustrated in FIG. 1B, the authentic program may be overwritten with an unauthentic program transmitted from the cracker's computer 104 to the communication apparatus 101. The unauthentic program may be, for example, a program resulting from tampering of the book-selling software. The unauthentic program may falsify a delivery address input when the user of the communication apparatus 101 purchases, and consequently, the book purchased by the user may be stolen.

As illustrated in FIG. 1C, when an unauthentic program runs in the communication apparatus 101, the secure module 102 may determine that the target program TP is an unauthentic program. Upon determining that the target program TP is an unauthentic program, the secure module 102 may be put into a state in which the target program TP in the communication apparatus 101 cannot perform encrypted communication using the cryptographic key K. Thus, the unauthentic program may not be able to encrypt the falsified communication content by using the authentic cryptographic key K.

Although the authentic program encrypts the communication content by using the authentic cryptographic key K, the unauthentic program may not encrypt the falsified communication content by using the authentic cryptographic key K. As a result, the center 103 may not falsely identify the falsified communication content as communication content transmitted from the authentic program, the integrity of the communication may be ensured.

FIG. 2 illustrates an exemplary communication apparatus. FIG. 2 illustrates a hardware configuration of the communication apparatus 101. The communication apparatus 101 includes a processor 201, a read-only memory (ROM) 202, a random access memory (RAM) 203, and a hard disk drive (HDD) 204. The communication apparatus 101 further includes an interface 205, a display 206, and a secure module 102. The elements of the communication apparatus 101 may be interconnected through a bus 200.

The processor 201 may control the entire communication apparatus 101. The ROM 202 may store a program, such as a boot program. The RAM 203 may be used as a work area for the processor 201. Under the control of the processor 201, the HDD 204 may control writing/reading of data to/from a built-in hard disk.

The interface 205 may be coupled to the network 110, such as a local area network (LAN), a wide area network (WAN), or the Internet, and may be coupled to another apparatus through the network 110. The interface 205 that interfaces between the network 110 and the internal elements to control input/output of data from an external apparatus. The interface 205 may include, for example, a modem and a LAN adapter.

The display 206 displays, for example, a cursor, icons, tool boxes, documents, images, or data of functional information or the like. Examples of the display 206 may include a cathode ray tube (CRT) display, a TFT (thin film transistor) liquid crystal display, and a plasma display.

The secure module 102 reads the target program TP from the HDD 204 and generates or updates a scanning program for scanning the target program TP to detect tampering. The secure module 102 loads the target program TP and the scanning program into the RAM 203, performs encryption or decryption, or generates a random number. The secure module 102 may hold the cryptographic key K or user identification information in a secure manner.

The secure module 102 may also hold the authentic cryptographic key K or user identification information and the communication apparatus 101 may perform encryption or description or generate a random number. The secure module 102 outputs the cryptographic key K or the user identification information in accordance with a request from the communication apparatus 101. The secure module 102 may be provided inside or outside the communication apparatus 101.

Figure 3:
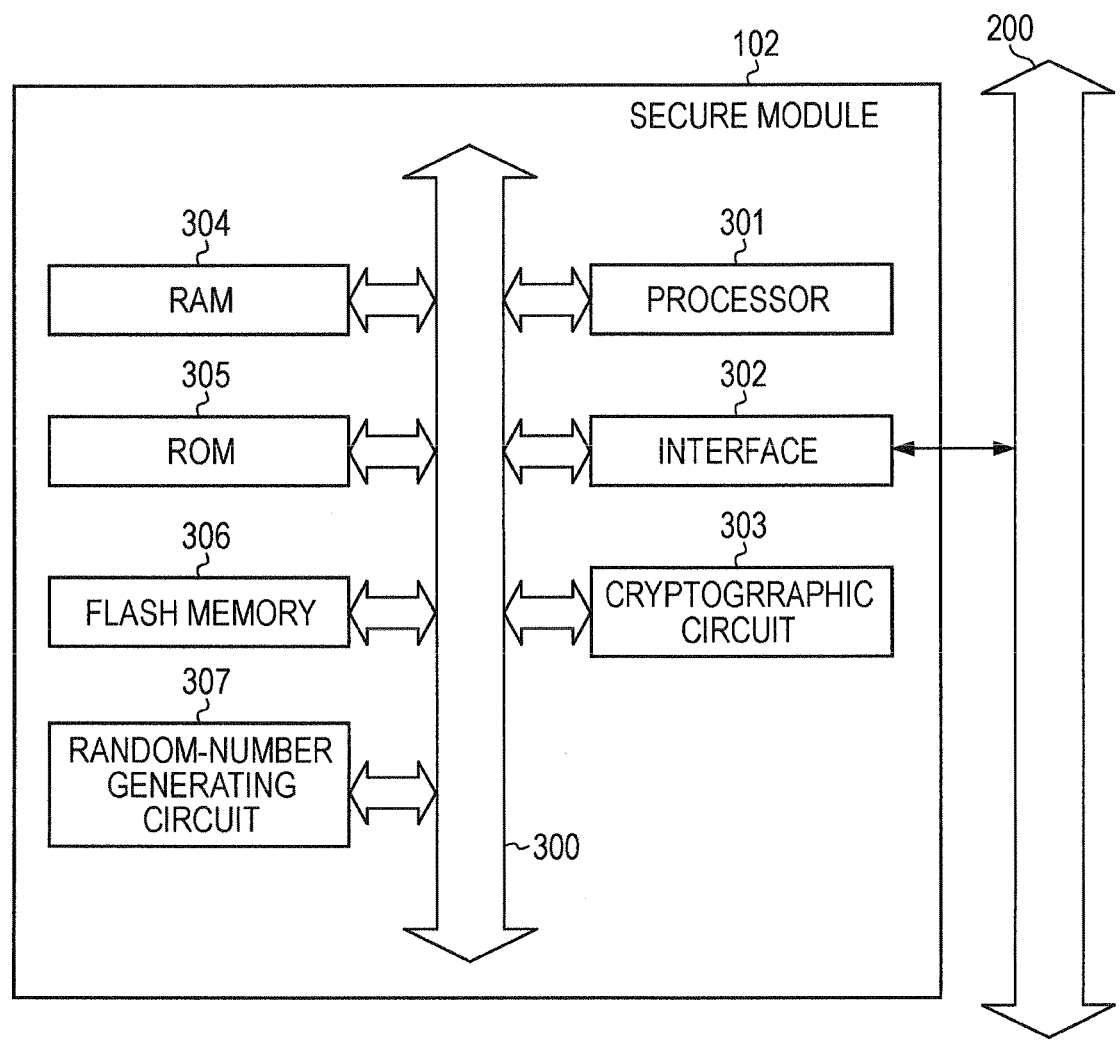
FIG. 3 illustrates an exemplary secure module.

FIG. 3 illustrates an exemplary secure module. The secure module illustrated in FIG. 3 may be the secure module 102 illustrated in FIG. 2. The secure module 102 includes a processor 301, an interface 302, a cryptographic circuit 303, a RAM 304, a ROM 305, a flash memory 306, and a random-number generating circuit 307.

The processor 301 controls the secure module 102 or performs computation. The interface 302 is coupled to the elements in the communication apparatus 101 through a bus 300 to communicate with an external apparatus. The cryptographic circuit 303 encrypts data or a program or decrypts encrypted data or an encrypted program.

The RAM 304 may be a main memory used as a work area for the processor 301. The ROM 305 may be a nonvolatile memory that stores a program and data. The ROM 305 may store the authentic cryptographic key K or the user identification information. The flash memory 306 may be a nonvolatile memory in which stored data or a stored program is rewritable. The random-number generating circuit 307 generates a random number.

For example, by incorporating the secure module 102 into a one-chip LSI, as illustrated in FIG. 3 the secure module 102 may not be externally tampered with. For example, the secure module 102 may have a TRM structure. The TRM structure physically or logically protects a semiconductor chip, for example, the secure module 102, against internal analysis and tampering. For example, a highly adhesive and strong coating may be applied to a portion inside the secure module 102. With such a such a structure, the internal circuit of the secure module 102 may be broken when the surface of the secure module 102 is removed. Dummy wires may also be provided.

Figure 4:
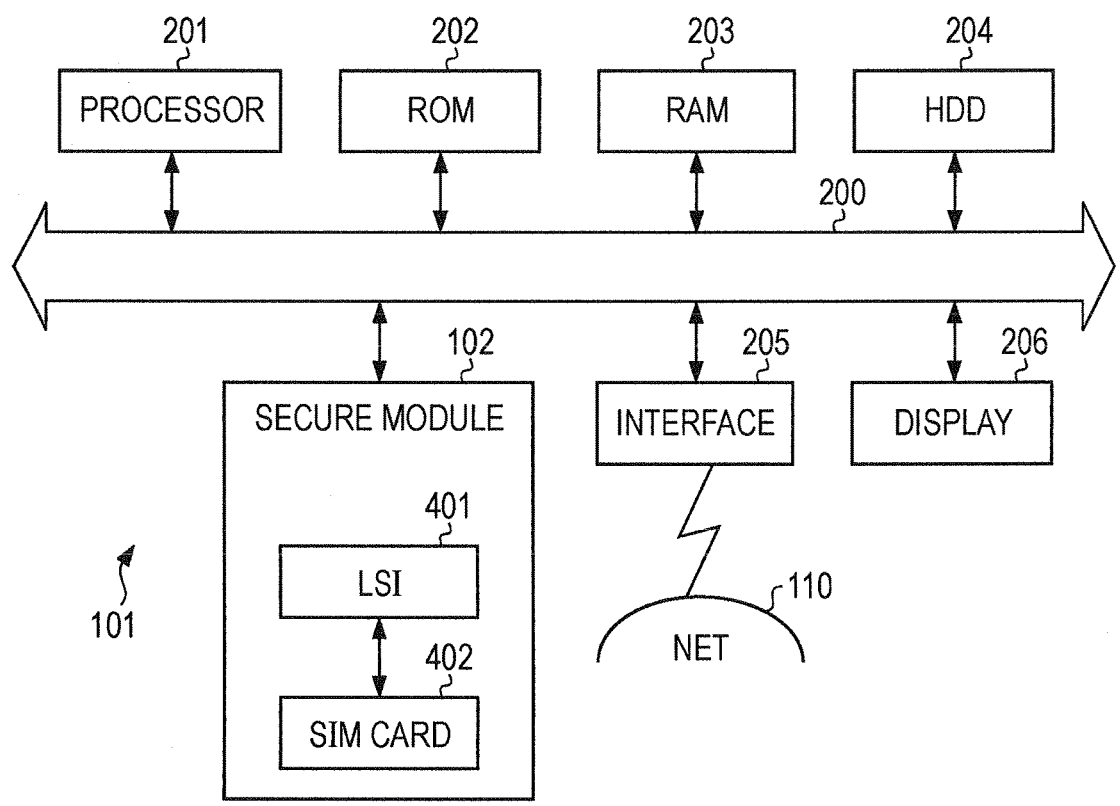
FIG. 4 illustrates an exemplary the communication apparatus.

FIG. 4 illustrates an exemplary communication apparatus. A communication apparatus 101 illustrated in FIG. 4 includes a processor 201, a ROM 202, a RAM 203, a HDD 204, an interface 205, a display 206, and a secure module 102. In FIG. 4, elements that are substantially the same as or similar to the elements illustrated in FIG. 2 are denoted by the same reference numerals, and descriptions thereof may be omitted or reduced.

The secure module 102 illustrated in FIG. 4 includes an LSI 401 for performing encryption or decryption or generating a random number and a SIM card 402 for holding the cryptographic key K or the user identification information in a secure manner. The LSI 401 reads the cryptographic key K from the SIM card 402 and encrypts or decrypts the cryptographic key K, as appropriate.

Figure 5:
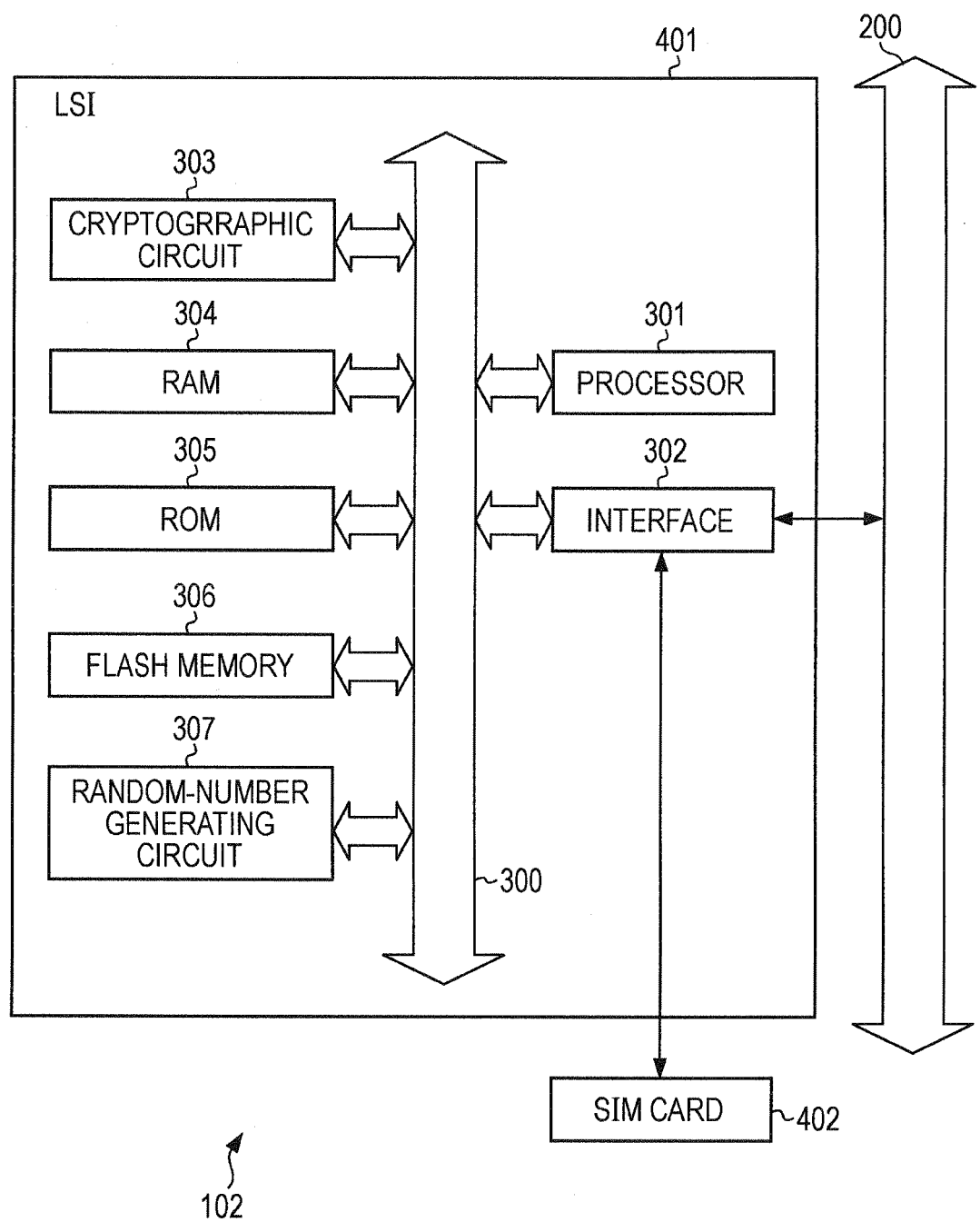
FIG. 5 illustrates an exemplary the secure module.

FIG. 5 illustrates an exemplary secure module. The secure module illustrated in FIG. 5 may be the secure module 102 illustrated in FIG. 4. The secure module 102 illustrated in FIG. 5 includes an LSI 401 and a SIM card 402. The LSI 401 includes a processor 301, an interface 302, a cryptographic circuit 303, a RAM 304, a ROM 305, a flash memory 306, and a random-number generating circuit 307. The SIM card 402 holds the cryptographic key K and the user identification information in a secure manner. In the secure module 102, the LSI 401 and the SIM card 402 are interconnected via the interface 302 to perform communication. In FIG. 5, elements that are substantially the same as or similar to the elements illustrated in FIG. 3 are denoted by the same reference numerals, and descriptions thereof may be omitted or reduced.

When the secure module 102 is a single module that includes multiple chips and that is entirely solidified with a resin, as illustrated in FIG. 5, third parties' tampering with the secure module 102 may be reduced.

Figure 6:
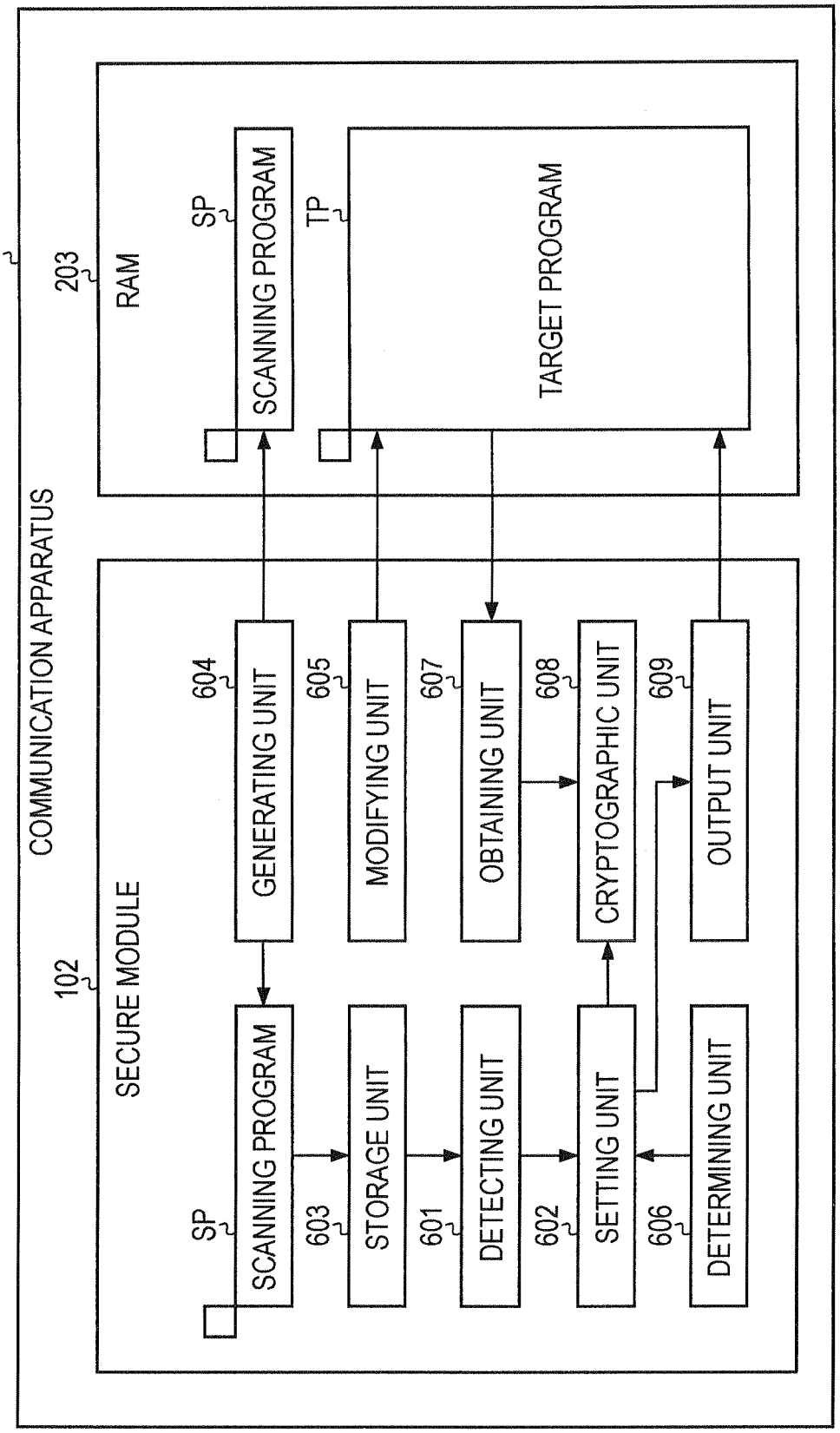
FIG. 6 illustrates an exemplary the secure module.

FIG. 6 illustrates an exemplary secure module. The secure module 102 includes a detecting unit 601, a setting unit 602, a storage unit 603, a generating unit 604, a modifying unit 605, a determining unit 606, an obtaining unit 607, a cryptographic unit 608, and an output unit 609.

The detecting unit 601 detects tampering of a program. The program may be held in the storage device of the communication apparatus 101. The program may use the cryptographic key K, held in the secure module 102, to perform encrypted communication with an apparatus (e.g., the center 103) external to the communication apparatus 101. For example, the program may include the target program TP.

For example, the scanning program may execute, in the communication apparatus 101, a scanning program on the program stored in a certain storage region in the storage device of the communication apparatus 101. The detecting unit 601 detects tampering of the program stored in the certain storage region, based on a result of the scanning-program execution performed by the communication apparatus 101 and code stored in the storage unit 603. The certain storage region may be a scan-target region including the target program TP in the RAM 203, for example, may be a scan-target region 230. The scanning program may be a program for detecting tampering of the target program TP, for example, may be a scanning program SP. The scanning program may be executed within the communication apparatus 101.

The code may be program code of the target program TP and the result of the scanning-program execution may be a given computation result for the program code of the target program TP. The given computation includes, for example, four arithmetic operations, logic operations, checksum calculation, or hash-value calculation using a hash function. The detecting unit 601 detects cracking-based tampering of the target program TP.

For example, the detecting unit 601 detects tampering of the program stored in the certain storage region, based on an execution result of the scanning program for the program stored in the certain storage region in the storage device in the communication apparatus 101 and the code stored in the storage unit 603. The scanning program may be executed within the secure module 102. The detecting unit 601 detects cracking-based tampering of the target program TP. Since the detecting unit 601 executes the scanning program in the secure module 102 whose integrity is ensured, cracking of the scanning program may be reduced.

The detecting unit 601 may operate when the processor 301 executes a program stored in the storage device, such as the ROM 305, the RAM 304, or the flash memory 306, illustrated in FIG. 3.

The setting unit 602 puts the secure module 102 into a state in which the program may not perform encrypted communication using the cryptographic key K.

For example, when the detecting unit 601 detects tampering of the program, the setting unit 602 may stop the cryptographic unit 608, the output unit 609, or all functions. The setting unit 602 may also set the secure module 102 so that it does not respond to a cryptographic-key K read request or a communication-content encryption request issued from the target program TP from which tampering is detected. Thus, the target program TP from which the tampering is detected may not perform encrypted communication using the cryptographic key K.

For example, the determining unit 606 may determine that the cracker's computer 104 disguising itself as the communication apparatus 101 is communicating with the secure module 102. The setting unit 602 may stop the cryptographic unit 608, the output unit 609, or all functions. The setting unit 602 may perform setting so that the secure module 102 may not communicate with the cracker's computer 104.

The setting unit 602 may operate when the processor 301 executes a program stored in the storage device, such as the ROM 305, the RAM 304, or the flash memory 306, illustrated in FIG. 3.

The storage unit 603 stores code unique to the program. The code unique to the program may include program code of the target program TP or a result of a certain computation for the program code. The certain computation may include, for example, four arithmetic operations, logic operations, checksum calculation, or hash-value calculation using a hash function.

For example, the storage unit 603 may hold the target program TP in the RAM 203 in the communication apparatus 101 or in the RAM 304 in the secure module 102. The storage unit 603 may store code unique to the target program TP held in the RAM 304 in the secure module 102.

The storage unit 603 may operate when the processor 301 executes a program stored in the storage device, such as the ROM 305, the RAM 304, or the flash memory 306, illustrated in FIG. 3.

The generating unit 604 generates a scanning program for performing scan process for generating the code unique to the program. The generating unit 604 randomly updates the scanning program for generating code that is substantially the same as or similar to the unique code. The scanning program may obtain the program code of the target program TP or may output a result of a certain computation on the obtained program code.

For example, the generating unit 604 generates a scanning program for performing scanning process at the communication apparatus 101 and generates code for detecting tampering of the target program TP, the code being unique to the target program TP. The generating unit 604 in the secure module 102 generates a scanning program for accessing the storage device of the communication apparatus 101. As a result, crackers' cracking the scanning program may be reduced.

For example, the generating unit 604 may update the scanning program periodically or irregularly. The generating unit 604 may reduce cracking of the scanning program by crackers.

The generating unit 604 may update the scanning program by performing "obfuscation", "change of the scan-target region", "change of the order of scan-target addresses", "addition of a scan computation result", or "addition of the address of the scanning program". As a result of the update of the scanning program, crackers' deciphering or tampering with the scanning program is reduced.

The generating unit 604 may function when the processor 301 executes the program stored in the storage device, such as the ROM 305, the RAM 304, or the flash memory 306, illustrated in FIG. 3.

The modifying unit 605 overwrites a program with a program having substantially the same function and having a different description system. For example, the modifying unit 605 modifies the target program TP by performing obfuscation, encryption, or shuffling. As a result, crackers' deciphering the target program TP may be reduced.

The modifying unit 605 may operate when the processor 301 executes a program stored in the storage device, such as the ROM 305, the RAM 304, or the flash memory 306, illustrated in FIG. 3, or when the modifying unit 605 is controlled via the interface 302.

The determining unit 606 measures an amount of time from when a program execution request is output to the processor 201 in the communication apparatus 101 until a response is obtained from the processor 201. The determining unit 606 determines whether or not the measured amount of time is larger than or equal to an allowable amount of time corresponding to a physical distance between the processor 203 in the communication apparatus 101 and the secure module 102.

For example, a timer provided in the secure module 102 starts the time measurement, when a request for executing the target program is output to the processor 201 in the communication apparatus 101. The secure module 102 measures an amount of time until a response is obtained and also determines whether or not the measured amount of time is lager than or equal to the allowable amount of time.

The cracker's computer 104 disguising itself as the communication apparatus 101 may communicate with the secure module 102. The amount of time measured by the timer may become larger than a amount of time estimated based on the physical distance between the processor 301 in the communication apparatus 101 and the secure module 102. Thus, based on the measured amount of time, the determining unit 606 determines whether or not the cracker is impersonating a legitimate user of the communication apparatus 101.

The determining unit 606 may operate when the processor 301 executes a program stored in the storage device, such as the ROM 305, the RAM 304, or the flash memory 306, illustrated in FIG. 3, or when the determining unit 606 is controlled via the interface 302.

The obtaining unit 607 obtains data that the program is to transmit to the external apparatus, prior to the transmission of the data. The obtaining unit 607 obtains, from the program, an output request for the cryptographic key K.

For example, the obtaining unit 607 obtains, via the interface 302, an output request for the cryptographic key K and communication content to be transmitted from the target program TP to the center 103. The obtaining unit 607 obtains the communication content to be encrypted.

The obtaining unit 607 may operate when the processor 301 executes a program stored in the storage device, such as the ROM 305, the RAM 304, or the flash memory 306, illustrated in FIG. 3, or when the obtaining unit 607 is controlled via the interface 302.

The cryptographic unit 608 uses the cryptographic key K to encrypt the communication content obtained by the obtaining unit 607. The cryptographic key K may be, for example, the secret key of the secure module 102 or the common key that is common to the center 103. The cryptographic unit 608 may encrypt the communication content without outputting the cryptographic key K.

The cryptographic unit 608 may operate when the processor 301 executes a program stored in the storage device, such as the ROM 305, the RAM 304, or the flash memory 306, illustrated in FIG. 3.

The output unit 609 outputs the cryptographic key K to the program. For example, when the obtaining unit 607 obtains the request for outputting the cryptographic key K, the output unit 609 outputs the cryptographic key K to the target program TP.

The output unit 609 may operate when the processor 301 executes a program stored in the storage device, such as the ROM 305, the RAM 304, or the flash memory 306, illustrated in FIG. 3, or when the output unit 609 is controlled via the interface 302.

The secure module 102 encrypts data processed by the obtaining unit 607 and the output unit 609. Crackers' cracking data on a communication channel between the secure module 102 and the processor 301 in the communication apparatus 101 may be reduced.

The secure module 102 may be coupled to the communication apparatus 101 via an interface with or without a hardware scanning function to check the authenticity of the target program TP in the communication apparatus 101.

The secure module 102 may be coupled to the communication apparatus 101 via an interface without a hardware scanning function, for example, a USB interface. The secure module 102 may issue a request for scanning a scan-target region in the memory to USB-compatible software, for example, a driver, via the USB interface. Through the scanning, the authenticity of the target program TP may be checked.

The USB-compatible software may be cracked. For example, the software in the communication apparatus 101 may be overwritten and a result indicating non-overwriting may be sent back. Consequently, scanning may not be effectively performed.

Figure 7:
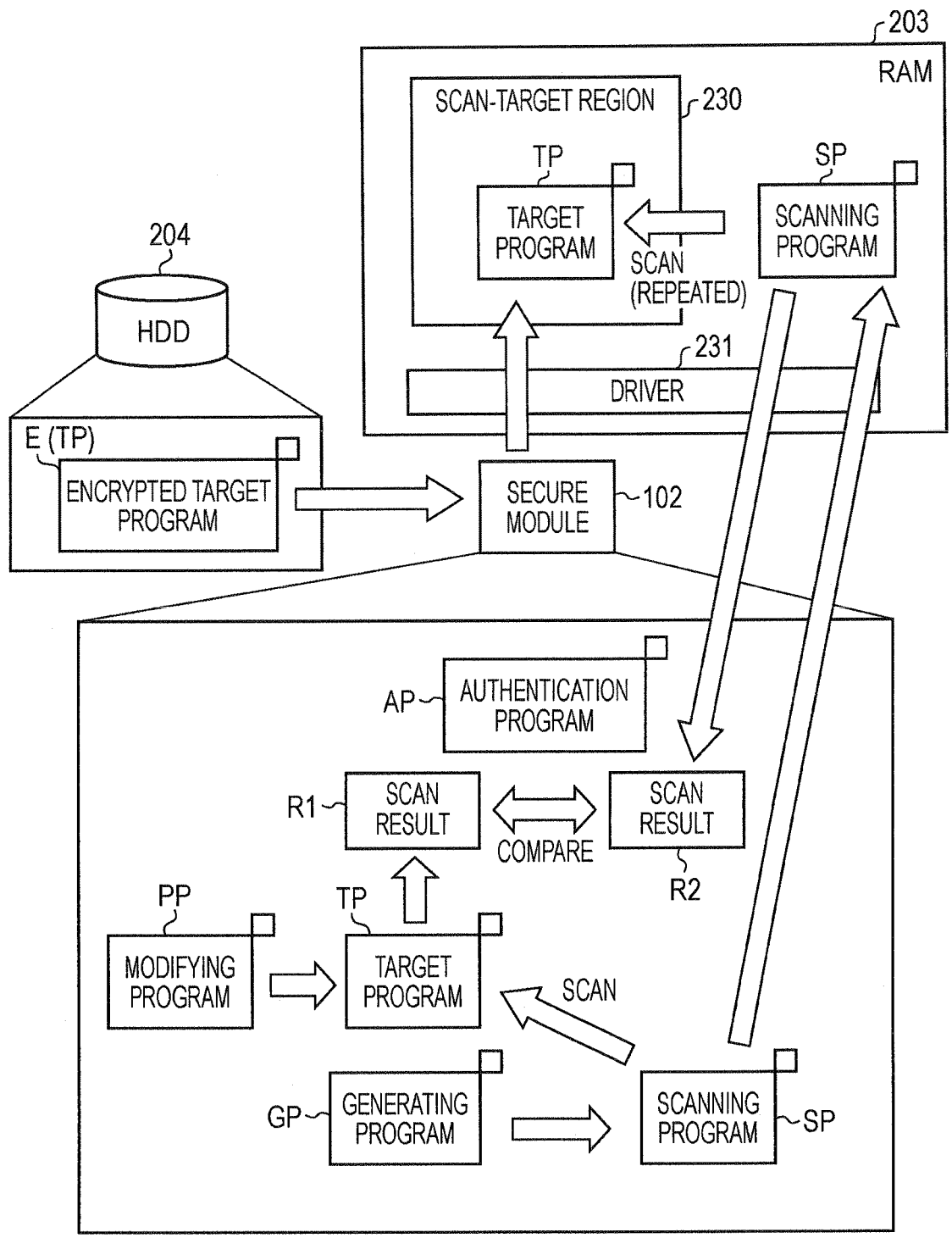
FIG. 7 illustrates an exemplary operation of the communication apparatus.

FIG. 7 illustrates an exemplary operation of the communication apparatus. For example, the secure module 102 obtains a target program encoded and stored in the HDD 204, for example, an encoded target program E (TP). The cryptographic circuit 303 in the secure module 102 decrypts the encoded target program E into a target program TP. The secure module 102 writes out the decrypted target program TP into a scan-target region 230 in the RAM 203. The target program TP may be held in the secure module 102.

When the target program TP stored in the HDD 204 is not encrypted, the secure module 102 may write out the target program TP into the scan-target region 230 in the RAM 203 without decrypting the target program TP.

The secure module 102 may modify the target program TP by using a modifying program PP. For example, the target program TP may be modified so as to have substantially the same function as the target program TP and have a process operation or a procedure that is substantially different from the target program TP. A modified program segment, which is part of the target program TP, may be held in the secure module 102. When the program segment in the secure module 102 is not referred to, the target program TP may not be executed in the communication apparatus 101. Through the modification, a computation program may be written to the target program TP.

The secure module 102 may periodically or irregularly execute a generating program GP for randomly and automatically generating/updating the scanning program SP. For example, a scanning program SP having a function for scanning the target program TP and performing a process operation that varies each time may be automatically generated at random.

For example, the scanning program SP may be automatically generated periodically at intervals of a few milliseconds to several minutes or may be automatically generated irregularly at random intervals. The interval may be set shorter than the amount of time taken for tampering by crackers.

The generating program GP may randomly change, for example, the scan-target region 230, the order of scan-target addresses, scan computation, computation process for returning the scan computation result to the secure module 102, code of the scanning program SP, or a position in the memory of the communication apparatus 101. Since the random and automatic generation/update process of the scanning program SP, the process being performed by the generating program GP, is executed within the secure module 102, analysis of the generation process may be reduced.

When the generating program GP generates or updates the scanning program SP, the latest scanning program SP in the secure module 102 may scan the target program TP, thereby updating a scan result R1. The scan result R1 may be stored in the RAM 304 or the flash memory 306. The scan result R1 may be unique code corresponding to the target program TP.

The processor 201 requests a driver 231 to load the scanning program SP into a non-scan-target region in the RAM 203. The driver 231 stores the scanning program SP, sent from the secure module 102, in the non-scan-target region in the RAM 203.

The scanning program SP stored in the RAM 203 scans the target program TP in the scan-target region 230, thereby obtaining a scan result R2. The scan result R2 is reported to the secure module 102 via the driver 231.

The secure module 102 receives the scan result R2 sent from the driver 231. Upon reception of the scan result R2, an authentication program AP compares the scan result R1 held in the secure module 102 with the received scan result R2.

When the scan results match each other, the target program TP may have not been tampered with. When the target program TP is overwritten, the secure module 102 issues, for example, an instruction for stopping the execution of the target program TP to the processor 201. The processor 201 may stop the target program TP based on the instruction.

When no scan result R2 is received from the driver 231 for a certain period of time, the secure module 102 may issue an instruction for stopping the execution of the target program TP to the processor 201.

The secure module 102 may repeatedly perform the above-described process until the operation of the target program TP is stopped.

Since the scanning program SP periodically or irregularly generated/updated at random by the secure module 102 operates, the scanning program stored in the rewritable memory space in the communication apparatus 101 may be protected from cracking.

The scanning program SP may be analyzed and overwritten with a false scanning program in a certain amount of time. Since the secure module 102 periodically or irregularly modifies the scanning program SP at random, the amount of time for analyzing the scanning program or overwriting it with a false scanning program may be insufficient.

The secure module 102 may be coupled the communication apparatus 101 via an interface having a hardware scanning function, for example, a DMA (direct memory access) interface.

Figure 8:
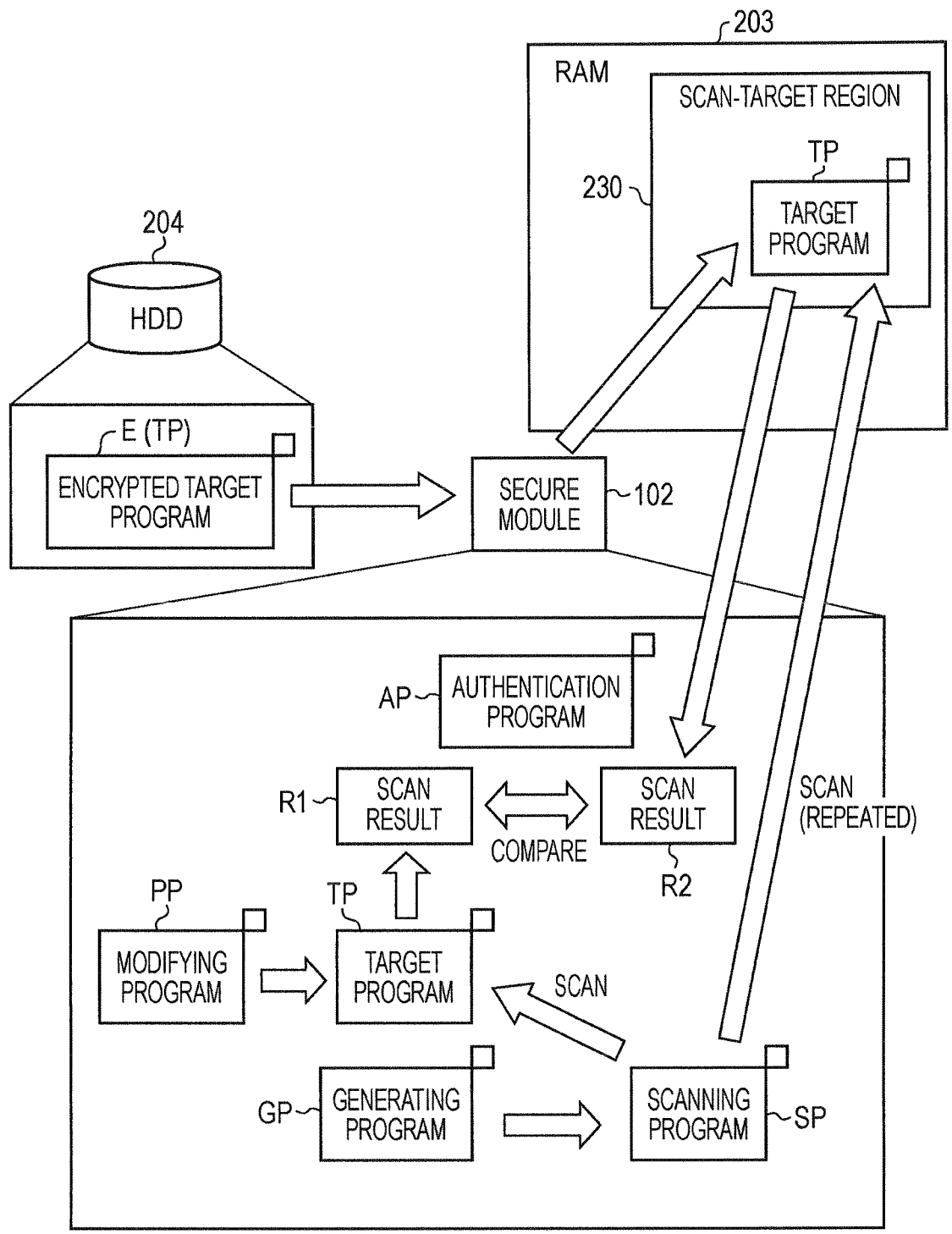
FIG. 8 illustrates an exemplary operation of the communication apparatus.

FIG. 8 illustrates an exemplary operation of the communication apparatus. The secure module 102 obtains an encrypted program E (TP) stored in the HDD 204. The cryptographic circuit 303 in the secure module 102 decrypts the encoded target program E into a target program TP. The secure module 102 writes the decrypted target program TP in the scan-target region 230 in the RAM 203. The target program TP may be held in the secure module 102.

The secure module 102 may periodically or irregularly execute the generating program GP for automatically generating/updating a scanning program SP at random. For example, a scanning program SP having a function for scanning the target program TP and having a different process operation may be automatically generated at random.

For example, the generating program GP may be generated periodically at intervals of a few milliseconds to several minutes or may be generated irregularly at random intervals. The interval may be set shorter than the amount of time taken for tampering by crackers.

The generating program GP may randomly change, for example, the scan-target region 230, the order of scan-target addresses, scan computation, computation process for returning the computation-scan result to the secure module 102, code of the scanning program SP, or a position in the memory in the communication apparatus 101. Since the random and automatic generation/update process of the scanning program SP, the process being performed by the generating program GP, is executed within the secure module 102, the process of the generation may not be snooped and analyzed.

When the generating program GP generates or updates the scanning program SP, the secure module 102 uses the latest scanning program SP to scan the target program TP, thereby updating a scan result R1. The scan result R1 may be stored in the RAM 304 or the flash memory 306. The scan result R1 may be unique code corresponding to the target program TP.

Using the DMA, the scanning program SP in the secure module 102 accesses the scan-target region 230 and scans the target program TP, thereby obtaining a scan result R2. The scan result R2 may be held in the secure module 102.

The authentication program AP compares the scan result R1 held in the secure module 102 with the scan result R2.

When the scan results match each other, the target program TP may have not been tampered with. When the target program TP is overwritten, the secure module 102 issues, for example, a notification for stopping the execution of the target program TP to the processor 201. The processor 201 stops the target program TP based on the notification.

The secure module 102 may repeatedly perform the above-described process until the operation of the target program TP is stopped.

Since the scanning program SP is provided without use of the processor 201 in the communication apparatus 101 or any driver, the scanning program SP may be protected from tampering through cracking of a driver.

FIGS. 9 to 12 illustrate exemplary scanning program. In FIGS. 9 to 12, location numbers "xx" and "xxx" represent logical addresses associated with a scan-target region.

The scanning program SP illustrated in FIG. 9 scans the target program TP. For example, values "1", "2", "3", "4", and "5" may be stored at memory locations 11, 12, 13, 14, and 15, respectively. At addresses 1 to 5, contents at memory locations 11 to 15 are written to memory locations 1001 to 1005, respectively. At address 6, the written values are added, and at address 7, the addition result, for example "15", is written to memory location 1010.

At address 8, computation for adding "+80" to the content "15" at memory location 1010 is performed, and the resulting value is subjected to computation "*5", so that (15+80)× 5=475 is obtained. At address 9, the computation result "475" at address 8 is written to memory location 1011, and at address 10, the content "475" at memory location 1011 is reported to the secure module 102.

The secure module 102 holds a scan result of preliminary scanning. When the scan result of the preliminary scanning and the scan result of the target program TP in the scan-target region 230 substantially match each other, the target program TP may have not been tampered with. When the scan result of the preliminary scanning and the scan result of the target program TP in the scan-target region 230 do not match each other, the target program TP may have been tampered with. In this case, an instruction for stopping the target program TP may be issued.

In the scanning program SP illustrated in FIG. 10, the scan-target addresses from which the values at addresses 1 to 5 in the scanning program SP illustrated in FIG. 9 are to be read are changed from memory locations 11 to 15 to memory locations 21 to 25. Since values at memory locations 21 to 25 are read, a scan result to be reported to the secure module 102 may be different from the scan result illustrated in FIG. 9.

In the scanning program SP illustrated in FIG. 11, the order of scan-target addresses for the scanning program SP illustrated in FIG. 9 is changed and a computation that depends on the change of the order of scan-target addresses is changed. For example, the order of scan-target addresses at addresses 1 to 5 is changed. In addition, the computation for address 6 may be randomly overwritten. The scan result reported to the secure module 102 may be different from the scan result illustrated in FIG. 9.

Since the scanning program SP illustrated in FIG. 11 is not held in a specific storage region, the scanning program SP illustrated in FIG. 12 may not execute scanning. The secure module 102 specifies the address at which the scanning program SP is held.

For example, at addresses 1 to 5, the address at which the scanning program SP is held, for example, the leading address of the scanning program SP, may be added to the values of the scan-target addresses from which the values are to be read. When the scan result R1 of the scanning program SP held by the secure module 102 and illustrated in FIG. 12 and the scan result R2 of the target program TP in the scan-target region 230 substantially match each other, the scanning program SP is loaded at a predetermined position and thus the target program TP may have not been tampered with.

When the scan results do not match each other, the target program TP is stopped since the scanning program SP may be held at another position.

When the memory location at which the scanning program SP is stored is different, the scan result varies. Cracking for analyzing the operation of the scanning program SP written at the different memory location may be reduced.

Figure 13:
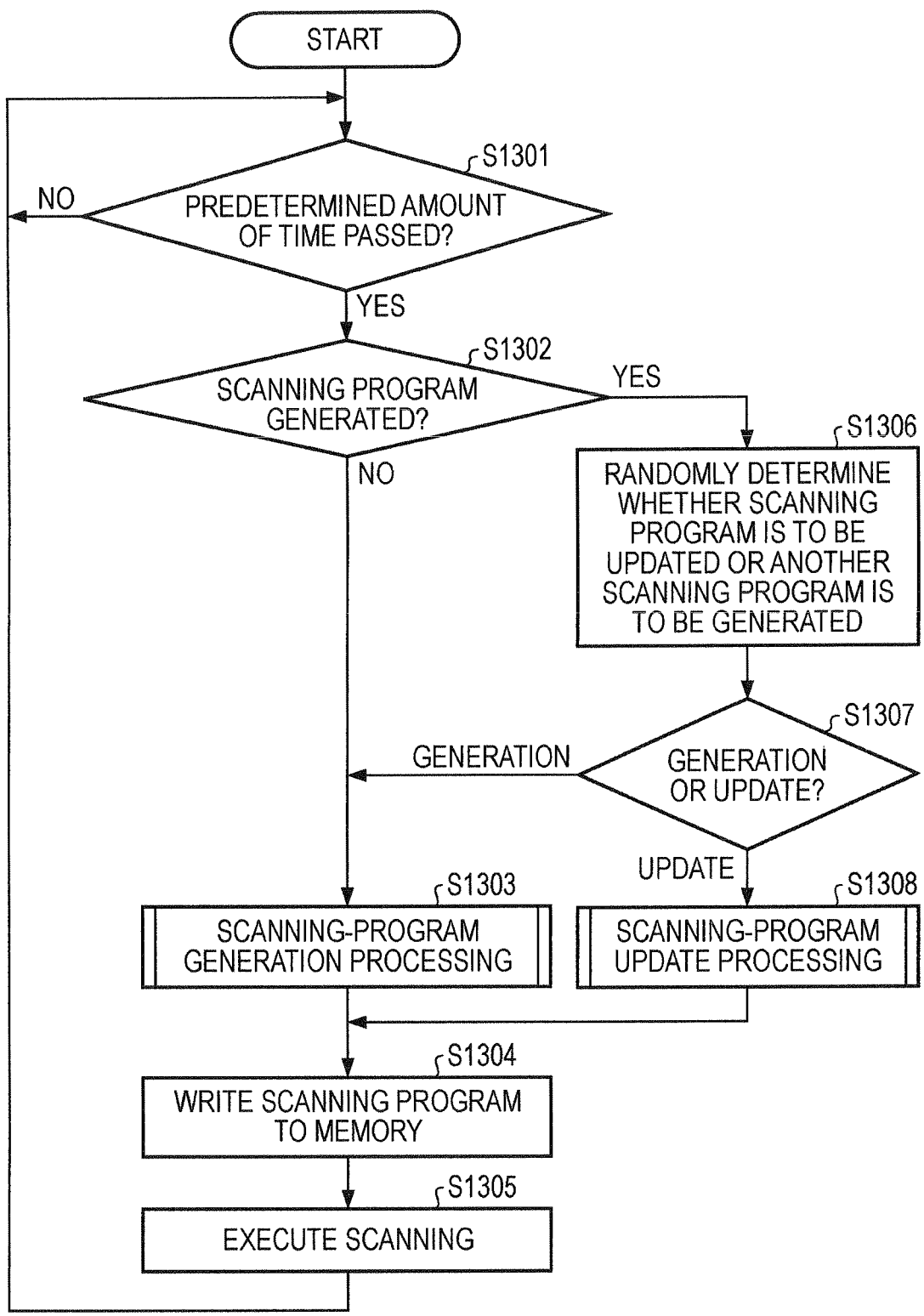
FIG. 13 illustrates an exemplary scanning-program generation/update process.

FIG. 13 illustrates an exemplary scanning-program generation/update process. The processor 301 in the secure module 102 executes the generating program GP, thereby generating/updating a scanning program SP.

The secure module 102 waits until a certain amount of time passes. For example, the measurement of the certain amount of time is triggered by the start of execution of the target program TP written to the scan-target region 230 in the RAM 203. The certain amount of time may be, for example, several a few milliseconds to several minutes. The certain amount of time may be randomly set in the range of a few milliseconds to several minutes.

Figure 14:
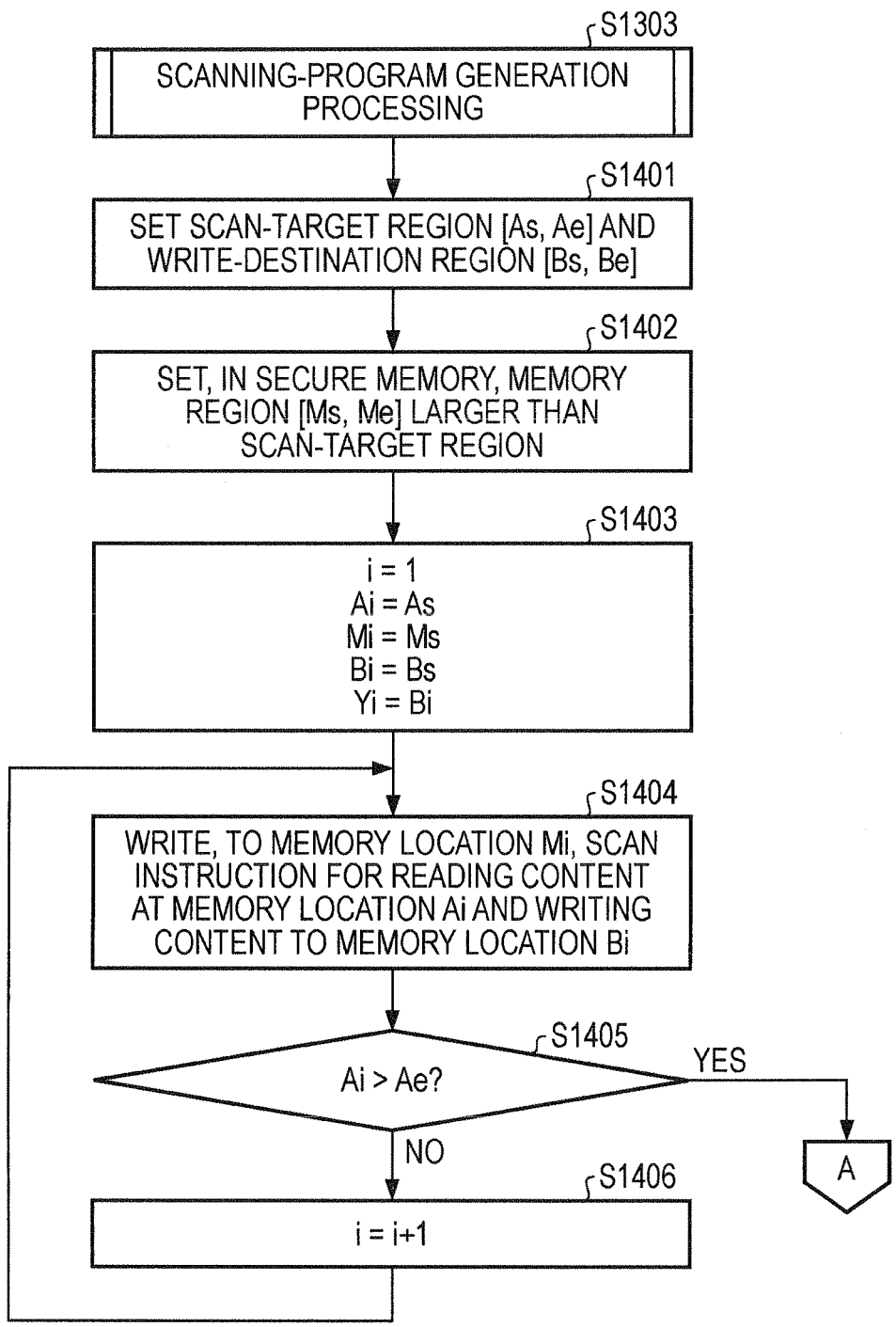
FIG. 14 illustrates an exemplary scanning-program generation process.
Figure 15:
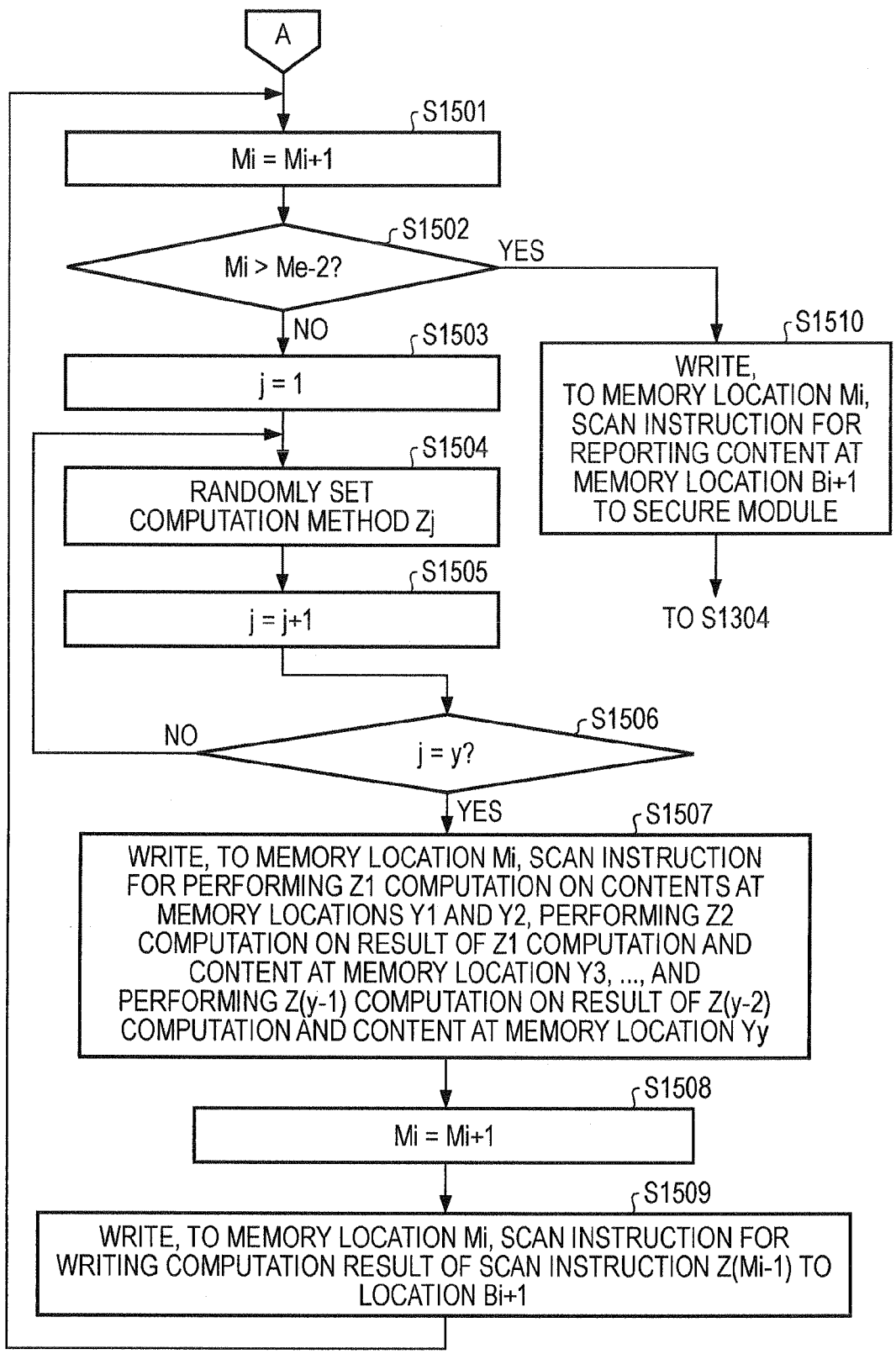
FIG. 15 illustrates an exemplary scanning-program generation process.

When the certain amount of time passes, in an operation S1302, the secure module 102 determines whether or not a scanning program SP is generated. When no scanning program SP is generated, the process proceeds to an operation S1303 in which the secure module 102 generates a scanning program, for example, as illustrated in FIG. 14 or 15. Subsequently, in an operation S1304, the secure module 102 writes the generated scanning program SP to the non-scan-target region in the RAM 203.

In an operation S1305, the secure module 102 scans the target program TP by using the generated scanning program SR The scan result may be held in the secure module 102, for example, in the RAM 304 or the flash memory 306. The process then returns to the operation S1301.

When a scanning program SP is already generated, the process proceeds to an operation S1306 in which the secure module 102 randomly determines whether the scanning program SP is to be updated or another scanning program SP is to be generated. When it is determined in an operation S1307 that another scanning program SP is to be generated, the process proceeds to the operation S1303. When it is determined in the operation S1307 that the scanning program SP is to be updated, the process proceeds to an operation S1308 in which, for example, a scanning-program update process illustrated in FIGS. 16 and 17 may be executed. In the operation S1304, the updated scanning program SP may be written to the non-scan-target region in the RAM 203.

In the operation S1305, the secure module 102 scans the target program TP by using the updated scanning program SP. The scan result may be held in the secure module 102, for example, the RAM 304 or the flash memory 306. The process then returns to the operation S1301.

For example, upon ending of the target program TP, the target program TP is deleted from the scan-target region 230 and the secure module 102 ends the scanning-program generation/update.

FIG. 14 illustrates an exemplary scanning-program generation process. The scanning-program generation process illustrated in FIG. 14 may correspond to the scanning-program generation process, for example, the operation S1303, illustrated in FIG. 13. In an operation S1401, the secure module 102 sets a scan-target region 230 [As, Ae] and a write-destination region [Bs, Be] in the RAM 203 outside the secure module 102. The size of the scan-target region 230 [As, Ae] may be substantially the same as the size of the target program TP or the size of part of the target program TP.

When the size of the scan-target region 230 [As, Ae] and the size of the part of the target program TP are substantially the same, the scan-target region 230 [As, Ae] is set in a different range each time a scanning program is generated. For example, each time a scanning program is generated, the scan-target region 230 [As, Ae] may be shifted.

In an operation S1402, the secure module 102 sets a memory region [Ms, Me] larger than the scan-target region 230, for example, an in-secure-module region, in the RAM 304 or the flash memory 306 in the secure module 102. In an operation S1403, the secure module 102 sets initial values for various variables. i may be a variable having an initial value of 1. Ai may be an arbitrary address in the scan-target region 230 and the initial value thereof may be a first address As. Bi may be an arbitrary address in the write-destination region and the initial value thereof may be a first address Bs.

Mi may be an arbitrary address in the in-secure-module region and the initial value thereof may be a first address Ms. Yi may be an address used in the scanning program SP and the initial value may be Bi. In an operation S1404, the secure module 102 writes, to memory location Mi in the in-secure-module region, a scan instruction for reading the content at memory location Ai and writing the content to memory location Bi.

In an operation S1405, the secure module 102 determines whether or not Ai>Ae is satisfied. Ae may be a last address in the scan-target region 230. When Ai>Ae is not satisfied, i is incremented in an operation S1406 and the process returns to the operation S1404. When Ai>Ae is satisfied, the process proceeds to, for example, an operation S1501 illustrated in FIG. 15.

FIG. 15 illustrates an exemplary scanning-program generation process. The scanning-program generation process illustrated in FIG. 15 may correspond to the scanning-program generation process, for example, the operation S1303, illustrated in FIG. 13. For example, after the operation S1405 illustrated in FIG. 14, memory location Mi in the in-secure-module region is incremented in the operation S1501. Subsequently, in an operation S1502, a determination is made as to whether or not Mi>Me−2 is satisfied.

When Mi>Me−2 is not satisfied, the initial value of a variable j is set to 1 (i.e., j=1) in an operation S1503. In an operation S1504, a computation method Zj is randomly set. The computation method may include, for example, four arithmetic operations, logic operations, checksum calculation, or hash-value calculation using a hash function. The computation using the computation method Zj may be referred to as "Zj computation".

In an operation S1505, the secure module 102 increments j. In an operation S1506, the secure module 102 determines whether or not j=y is satisfied, where y may be the number of addresses Yi, for example, the number of memory locations Mi in the in-secure-module region.

When j=y is not satisfied in an operation S1506, the process returns to the operation S1504. When j=y is satisfied in the operation S1506, the process proceeds to an operation S1507 in which the secure module 102 writes, to memory location Mi, a scan instruction Z(Mi) for performing a Z1 computation on the content at memory location Y1 and the content at memory location Y2, a Z2 computation on the result of the Z1 computation and the content at memory location Y3, . . . , and a Z(y−1) computation on the result of Z(y−2) computation and the content at memory location Yy.

In an operation S1508, the secure module 102 increments Mi. In an operation S1509, the secure module 102 writes, to memory location Mi, a scan instruction for writing the calculation result of the scan instruction Z(Mi−1) to memory location Bi+1. The process then returns to the operation S1501.

When Mi>Me−2 is satisfied in the operation S1502, the process proceeds to an operation S1510 in which the secure module 102 writes, to memory location Mi, a scan instruction for reporting the content at memory location Bi+1 to the secure module 102. The process then proceeds to the operation S1304 in FIG. 13. In the scanning-program generation process, for example, in the operation 51303, a scanning program SP may be periodically or irregularly generated at random.

Figure 16:
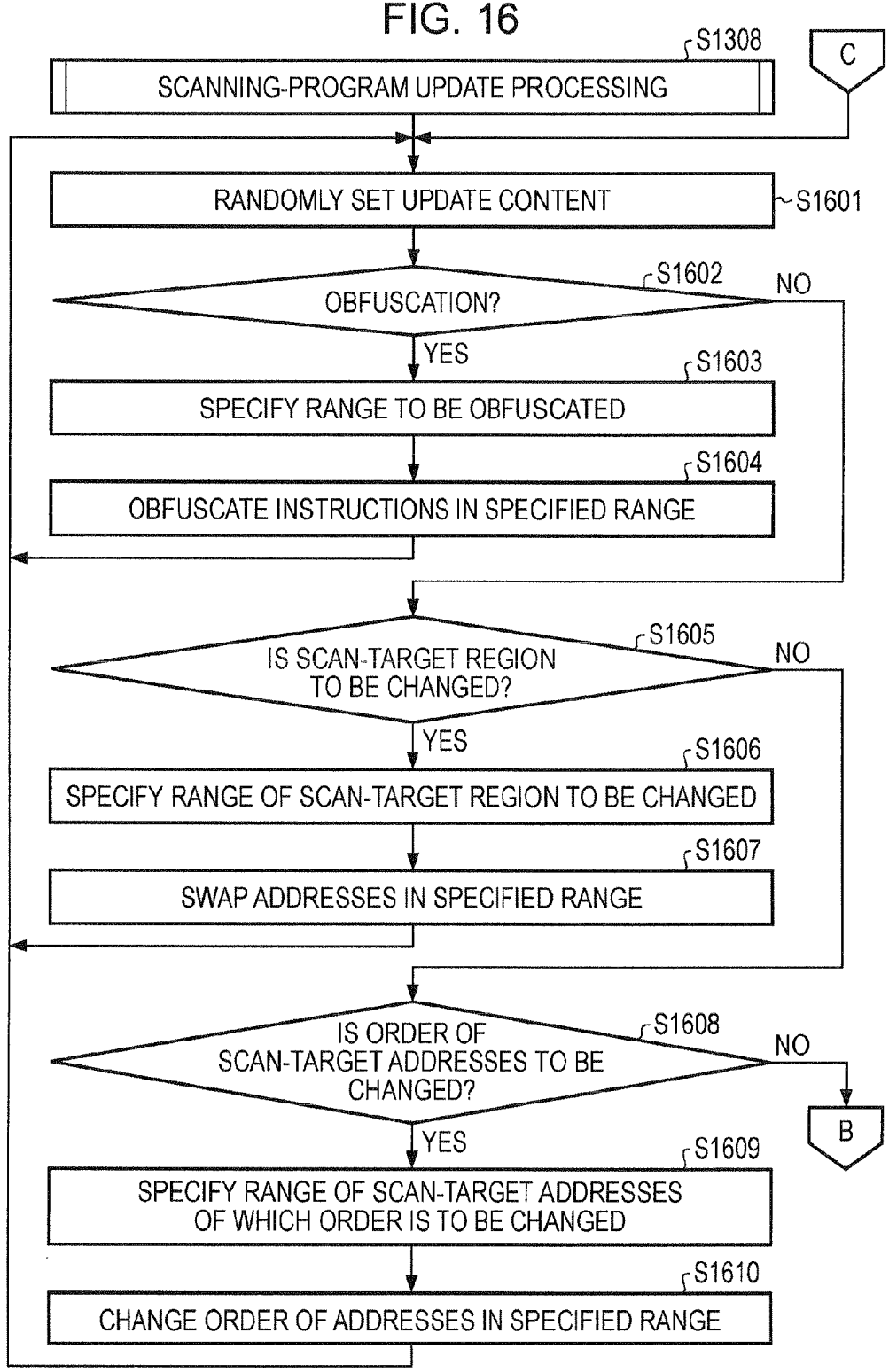
FIG. 16 illustrates an exemplary scanning-program update process.

FIG. 16 illustrates an exemplary scanning-program update process. The scanning-program update process illustrated in FIG. 16 may correspond to the operation S1308 illustrated in FIG. 13. In an operation S1601, the secure module 102 randomly sets update content. The update content may include, for example, "obfuscation", "change of the scan-target region", "change of the order of scan-target addresses", "addition of a scan computation result", "addition of the address of the scanning program SP", or "doing nothing".

The scanning-program update process may include at least one of the aforementioned six update contents.

As illustrated in FIG. 16, in an operation S1602, the secure module 102 determines whether or not the update content indicates "obfuscation". Obfuscation complicates an instruction or an instruction group. For example, certain program code may be overwritten with program code having substantially the same function and having a substantially different process operation. A single instruction, for example, "X=1+

Y" may be updated to "X=10−9+2Y−Y". For example, "X=1+Y" and "Z=X+50" may be updated to "X=26+Y" and "Z=X+25".

The updated instruction may be an instruction having substantially the same function as the pre-update instruction and having program code that is different from that of the pre-update instruction. The program code of the generating program GP is varied each time it is updated.

When it is determined in the operation S1602 that the update content indicates "obfuscation", the process proceeds to an operation S1603 in which the secure module 102 specifies a range to be obfuscated in the target program TP. In an operation S1604, instructions included in the specified range are obfuscated. The process then returns to the operation S1601.

When it is determined in the operation S1602 that the update content does not indicate "obfuscation", the process proceeds to an operation S1605 in which the secure module 102 determines whether or not the update content indicates the "change of the scan-target region".

In the change of the scan-target region, the scan-target address specified by the scanning program SP may be changed to a different address in the scan-target region. For example, when the scanning program SP illustrated in FIG. 9 is updated to the scanning program SP illustrated in FIG. 10, the scan-target region may be changed.

When it is determined in the operation S1605 that the update content indicates the "change of the scan-target region", the process proceeds to an operation S1606 in which the secure module 102 specifies a range of the scan-range region to be changed in the target program TP. In an operation S1607, the addresses in the specified range are changed. The process then returns to the operation S1601.

In the change of the scan-target region, although the address to be accessed by the generating program GP is changed, the function of the scanning program SP is not changed. Since the scan-target region 230 is changed and the scan result is updated, the security level may be improved.

When it is determined in the operation S1605 that the update content does not indicate the "change of the scan-target region", the process proceeds to an operation S1608 in which the secure module 102 determines whether or not the update content indicates the "change of the order of scan-target addresses". In the change of the order of scan-target addresses, the codes at addresses included in the scanning program SP are swapped.

For example, when the scanning program SP illustrated in FIG. 9 is updated to the scanning program SP illustrated in FIG. 11, the order of scan-target addresses may be changed. Although the order of execution may be changed, the scan result before the swapping and the scan result after the swapping may or may not be different from each other.

When it is determined in an operation S1608 that the update content indicates the "change of the order of scan-target addresses", the process proceeds to an operation S1609 in which the secure module 102 specifies a range of scan-target addresses of which the order is to be changed in the target program TP. In an operation S1610, the secure module 102 swaps the codes at the addresses in the specified range. The process then returns to the operation S1601. When it is determined in an operation S1608 that the update content does not indicate the "change of the order of scan-target addresses", the process proceeds to an operation S1701 illustrated in FIG. 17.

Figure 17:
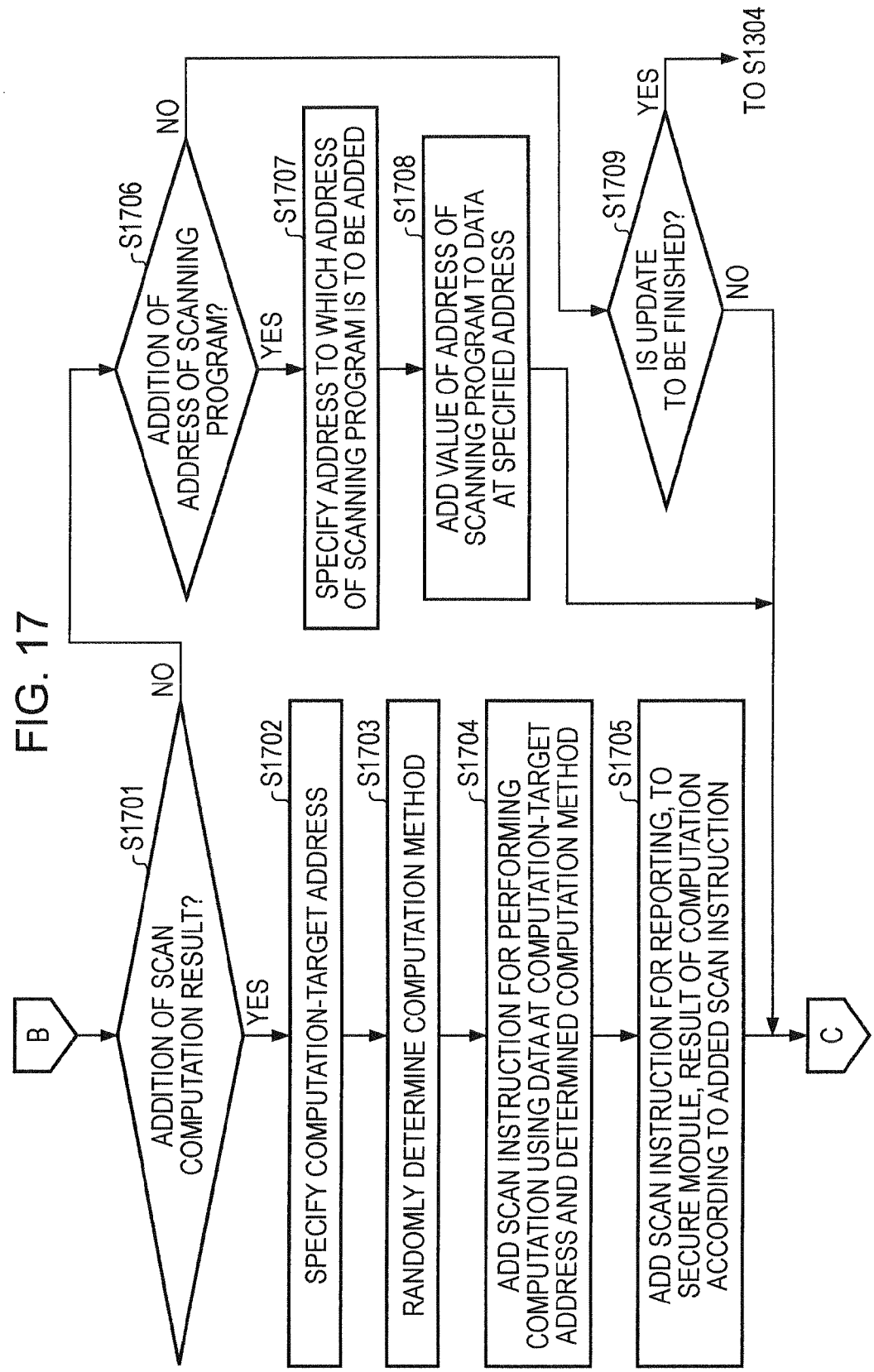
FIG. 17 illustrates an exemplary scanning-program update process.

FIG. 17 illustrates an exemplary scanning-program update process. The scanning-program update process illustrated in FIG. 17 may correspond to the operation S1308 illustrated in FIG. 13. In the operation S1701, the secure module 102 may randomly determine whether or not that the update content determined in the operation S1601 indicates the "addition of a scan computation result".

When the update content indicates the "addition of a scan computation result", the process proceeds to an operation S1702 in which the secure module 102 specifies a computation-target address in the target program TP. In an operation S1703, the secure module 102 may randomly determine a computation method. The computation method may include, for example, four arithmetic operations or logic operations with respect to data at the computation-target address, checksum calculation of the data, or hash-value calculation using a hash function.

In an operation S1704, the secure module 102 adds, to the generating program GP to be updated, a scan instruction for performing computation by using the data at the computation-target address and the computation method determined in the operation S1703. In an operation S1705, the secure module 102 adds, to the generating program GP to be updated, a scan instruction reporting a result of the computation according to the added scan instruction to the secure module 102. The process then returns to the operation S1601.

When it is determined in the operation S1701 that the update content does not indicate the "addition of a scan computation result", the process proceeds to an operation S1706 in which the secure module 102 determines whether or not the update content indicates the "addition of the address of the scanning program SP". In the addition of the address of the scanning program SP, a scan result that is dependent on the address at which the scanning program SP is written, the address being used for an instruction of the scanning program SP, may be obtained.

For example, when the scanning program SP illustrated in FIG. 11 is updated to the scanning program SP illustrated in FIG. 12, the address of the scanning program SP may be added.

When it is determined in the operation S1706 that the update content indicates the "addition of the address of the scanning program SP", the process proceeds to an operation S1707 in which the secure module 102 specifies, in the target program TP, an address to which the address of the scanning program SP is to be added. In an operation S1708, the value of the address of the scanning program SP is added to the data at the specified address, as indicated at addresses 1 to 5 in FIG. 12. The process then returns to the operation S1601.

When it is determined in the operation S1706 that the update content does not indicate the "addition of the address of the scanning program SP", the process proceeds to an operation S1709 in which the secure module 102 determines whether or not the update of the generating program GP is to be finished. For example, when the update content indicates "doing nothing", the update may not be finished if an update is not performed. The process then returns to an operation S1601.

When the update is performed once or a certain number of times, the update may be finished. The process returns to operation S1304 illustrated in FIG. 13.

Since the update is executed within the secure module 102 having the tamper-proof structure, the generation/update of the scanning program SP may be performed in a secure manner. Scanning-function disabling by cracking may be reduced and the security of a USB connection may be enhanced.

As illustrated in FIG. 7, the modifying program PP, which is executed by the processor 301 in the secure module 102, may modify the target program TP.

Figure 18:
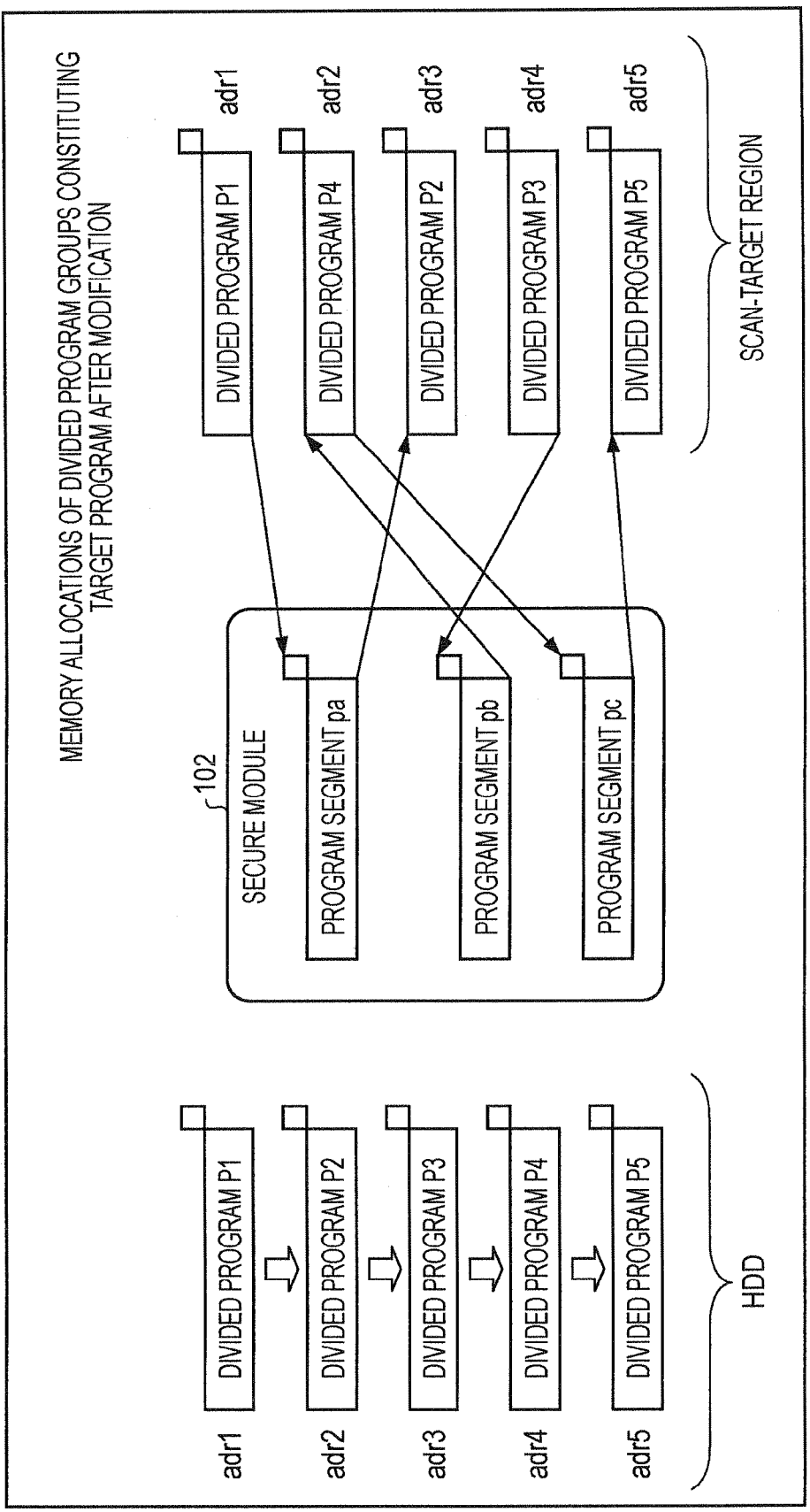
FIG. 18 illustrates an exemplary program modification.

FIG. 18 illustrates an exemplary program modification. A program may be a collection of instructions for respective addresses. For example, the target program TP may include five instructions for respective addresses. For example, the target program TP may include divided programs P1 to P5, which may be allocated in the order of addresses adr1 to adr5. The HDD 204 stores addresses adr1 to adr5 as logical addresses in the order of execution.

The modifying program PP may change the order of locations (e.g., may swap addresses) in the target program TP, for example, divided programs P1 to P5. In FIG. 18, address adr1 is allocated to the divided program P1, address adr2 is allocated to the divided program P4, address adr3 is allocated to the divided program P2, address adr4 is allocated to the divided program P3, and address adr5 is allocated to the divided program P5.

A read instruction for the secure module 102 may be added after the divided programs P1, P4, and P3. A program segment indicating the relationship of the changed addresses is held in the secure module 102. For example, a program segment pa may be a "Goto" statement referred to after execution of the divided program P1 so as to cause jump to address adr3.

For example, a program segment pb may be a "Goto" statement referred to after execution of the divided program P3 so as to cause jump to address adr2. For example, a program segment pc may be a "Goto" statement referred to after execution of the divided program P4 so as to cause jump to address adr5. The program segments pa to pc may be added during allocation. The scan result R1 before allocation and the scan result R1 after the allocation may be different from each other.

Figure 19:
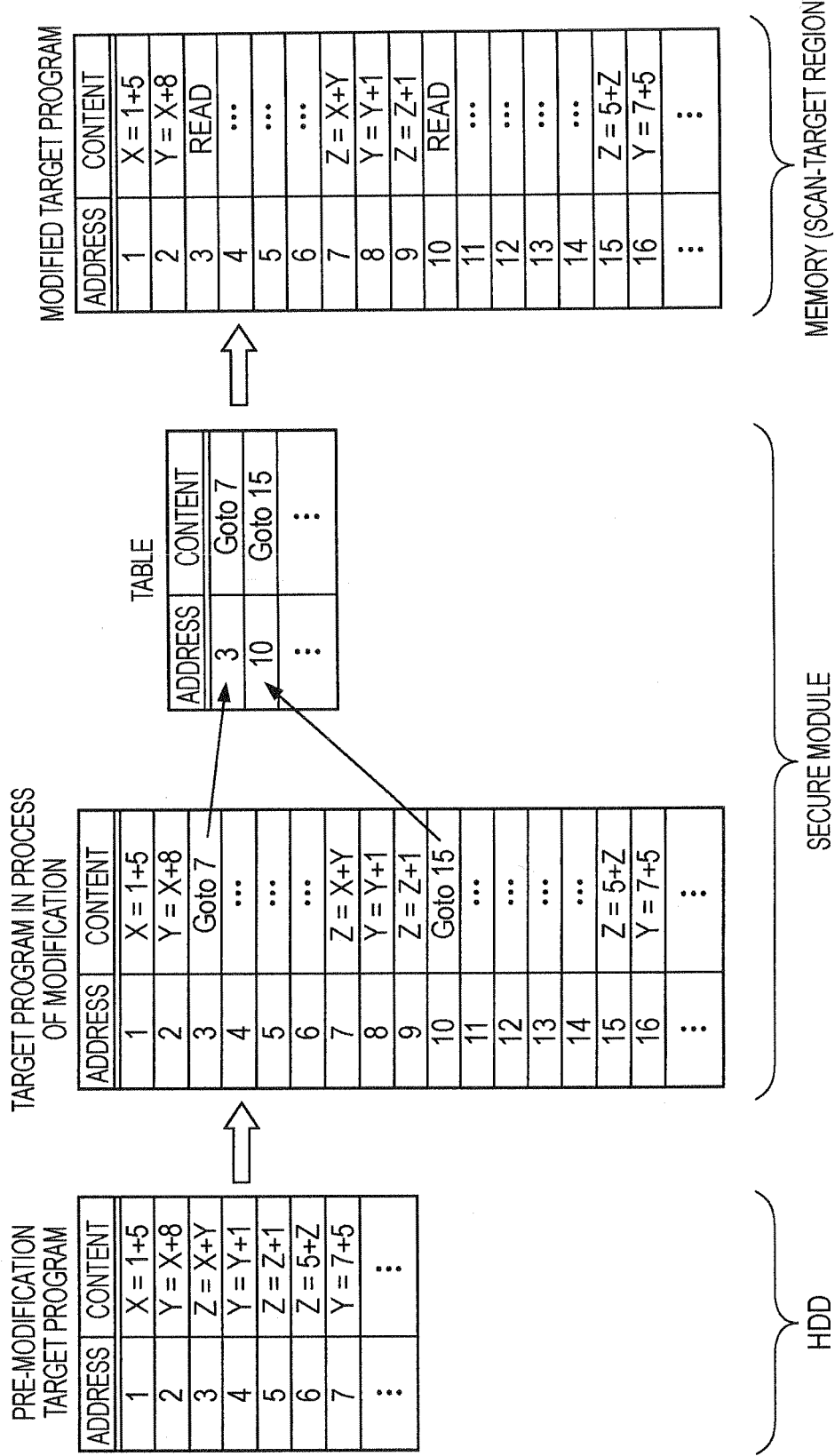
FIG. 19 illustrates an exemplary program modification.

FIGS. 19 to 22 illustrate an exemplary program modification. The modifying program PP may modify the target program TP. In FIG. 19, the addresses of an instruction group corresponding to addresses 3 and 5 in the target program TP in the HDD 204 are changed to addresses 7 and 9. Further, the addresses of the instruction group corresponding to addresses 6 and 7 in the target program TP are changed to addresses 15 and 16. The addresses of the instruction group corresponding to addresses 1 to 2 are not changed.

Before the modification, an instruction "Z=X+Y" corresponding to address 3 is executed next to an instruction "Y=X+8" corresponding to address 2. Since the address of the instruction "Z=X+Y" corresponding to address 3 has been changed to address 7, the instruction corresponding to address 3 is overwritten with a program segment indicating "Goto 7", for example, a jump instruction. The secure module 102 holds, in a table, a combination of address 3 and the program segment "Goto 7".

Before the modification, an instruction "Z=5+Z" corresponding to address 6 is executed next to an instruction "Z=Z+1" corresponding to address 5. Since the address of the instruction "Z=Z+1" corresponding to address 5 has been changed to address 9 and the instruction corresponding to address 6 has been changed to address 15, the instruction corresponding to address 10 is overwritten with a program segment "Goto 15", for example, a jump instruction. The secure module 102 holds, in the table, a combination of address 10 and the program segment "Goto 15".

Before writing the target program TP to the scan-target region 230, the secure module 102 overwrites the program segments with read instructions for the secure module 102. When the modified target program TP loaded in the scan-target region 230 is executed, the table in the secure module 102 is referred to based on the read instruction corresponding to address 3 and the program segment "Goto 7" corresponding to address 3 is specified. The secure module 102 reports "Goto 7" to the processor 201 and the processor 201 executes the instruction at address 7 in the modified target program TP.

Since instruction groups included in the target program TP are shuffled while the relationship of the instruction groups is maintained, deciphering the target program TP may become more difficult.

Figure 20:
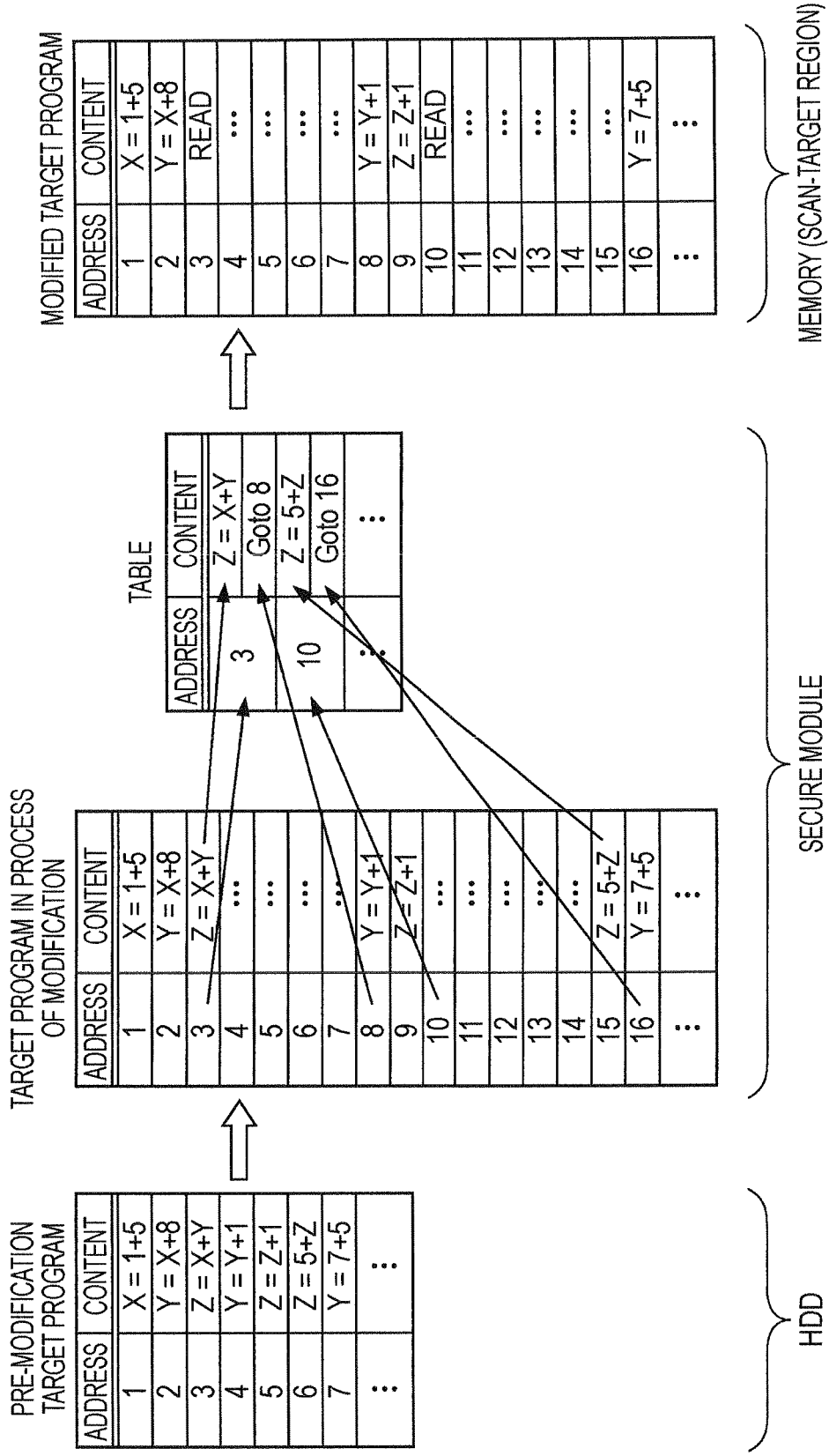
FIG. 20 illustrates an exemplary program modification.

In FIG. 20, instructions included in the target program TP may be inserted as program segments.

In FIG. 20, the addresses of an instruction group corresponding to addresses 4 and 5 in the target program TP in the HDD 204 are changed to addresses 8 and 9. The addresses of the instruction group corresponding to addresses 6 and 7 in the target program TP are changed to addresses 15 and 16. The addresses of the instruction group corresponding to addresses 1 to 3 are not changed.

Before the modification, an instruction "Z=X+Y" corresponding to address 3 is executed next to an instruction "Y=X+8" corresponding to address 2. Since the address of the instruction corresponding to address 4 has been changed to address 8, a Goto statement "Goto 8" is generated. The secure module 102 holds a combination of address 3, the instruction "Z=X+Y" at address 3, and the Goto statement "Goto 8". As a result of the complicated program segment, the security may be enhanced.

FIG. 21 illustrates an exemplary encryption of instructions. In FIG. 21, instruction groups included in the target program TP may be encrypted. The secure module 102 encrypts an instruction group corresponding to addresses 4 to 7 in the pre-modification target program TP by using cryptographic keys K1 to K4. A read instruction and a decryption instruction for the secure module 102 are inserted before each encrypted instruction. The addresses are sifted downward by an amount corresponding to the number of inserted instructions.

For example, an instruction "Y=Y+1" corresponding to address 4 is encrypted with the cryptographic key K1 and the encrypted instruction is written to address 6. A read instruction for the secure module 102 is inserted at empty address 4 and a decryption instruction is inserted at address 5.

The secure module 102 holds, in a table, a combination of the key with which the encrypted instruction in the modified target program TP was encrypted and the address of the read instruction inserted for the encrypted instruction. For example, a combination of the cryptographic key K1 with which the encrypted instruction E1(Y=Y+1) written at address 6 was encrypted and address 4 of the read instruction inserted based on the generation of the encrypted instruction E1(Y=Y+1) is held in the table.

The secure module 102 holds the table in the RAM 304 or the flash memory 306 and writes the modified target program TP to the scan-target region. When the modified target program TP is executed, the cryptographic key is read based on the inserted read instruction and the encrypted instruction is decrypted based on the decryption instruction. Subsequently, the decrypted instruction is executed. For example, the secure module 102 refers to the table based on the read instruction corresponding to address 4 to supply the cryptographic key K1 to the processor 201.

The processor 201 decrypts the encrypted instruction E1(Y=Y+1) based on the cryptographic key K1 and the decryption instruction corresponding to address 5 and writes the decrypted instruction "Y=Y+1" to address 6. The instruction "Y=Y+1" written to address 6 may be executed. Even when the scan-target program is partially encrypted, the decryption key is obtained from the secure module 102 and the process is continued.

Figure 22:
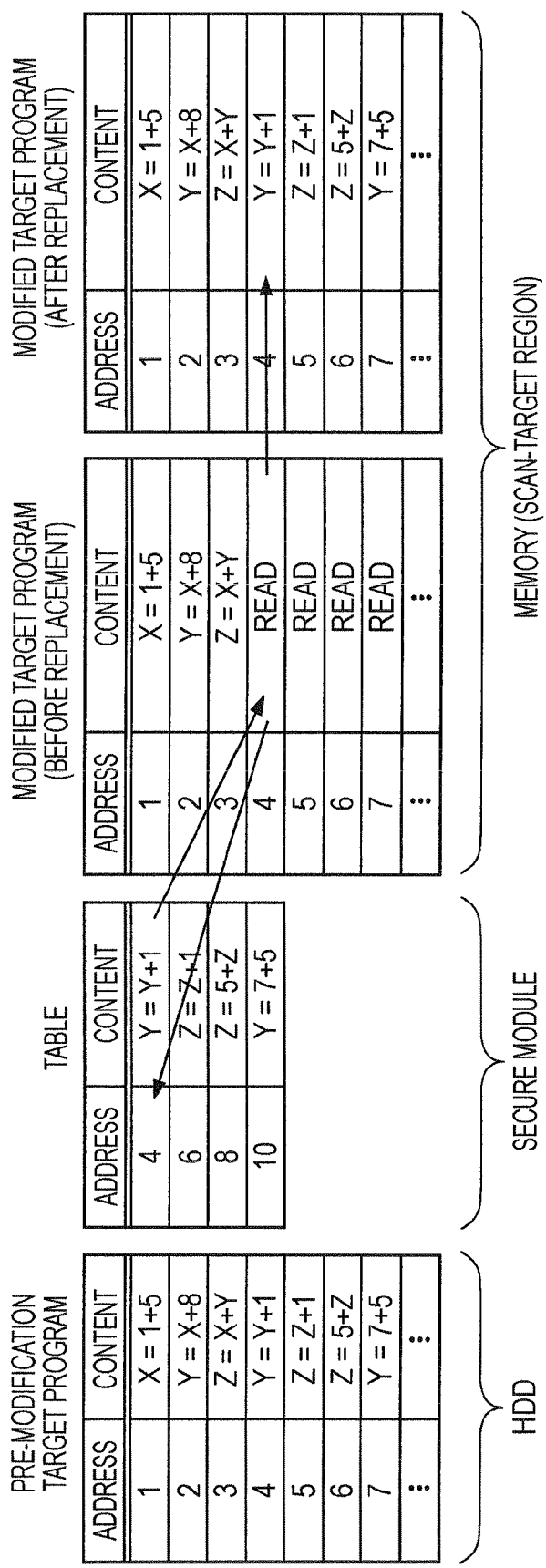
FIG. 22 illustrates an exemplary program modification.

FIG. 22 illustrates an exemplary encryption of instructions. The instructions illustrated in FIG. 22 may be included in the target program TP. In FIG. 22, the secure module 102 replaces an instruction group corresponding to addresses 4 to 7 in the pre-modification target program TP with read instructions for the secure module 102. For example, an instruction "Y=Y+1" corresponding to address 4 is replaced with a read instruction. An instruction for writing the instruction "Y=Y+1" at address 4 read from the secure module 102 is inserted at next address 5.

The secure module 102 holds, in the table, a combination of the replaced instruction and the address thereof. For example, the secure module 102 holds, in the table, a combination of the replaced instruction "Y=Y+1" and address 4 thereof.

The secure module 102 holds the table in the RAM 304 or the flash memory 306 and writes the modified target program TP to the scan-target region 230. When the modified target program TP is executed, the processor 201 reads the replaced instruction (i.e., the original instruction) based on the read instruction that replaced the original instruction and executes the replaced instruction. For example, the processor 201 reads the instruction "Y=Y+1" from the secure module 102 based on the read instruction at address 4 and executes the read instruction "Y=Y+1".

Figure 23:
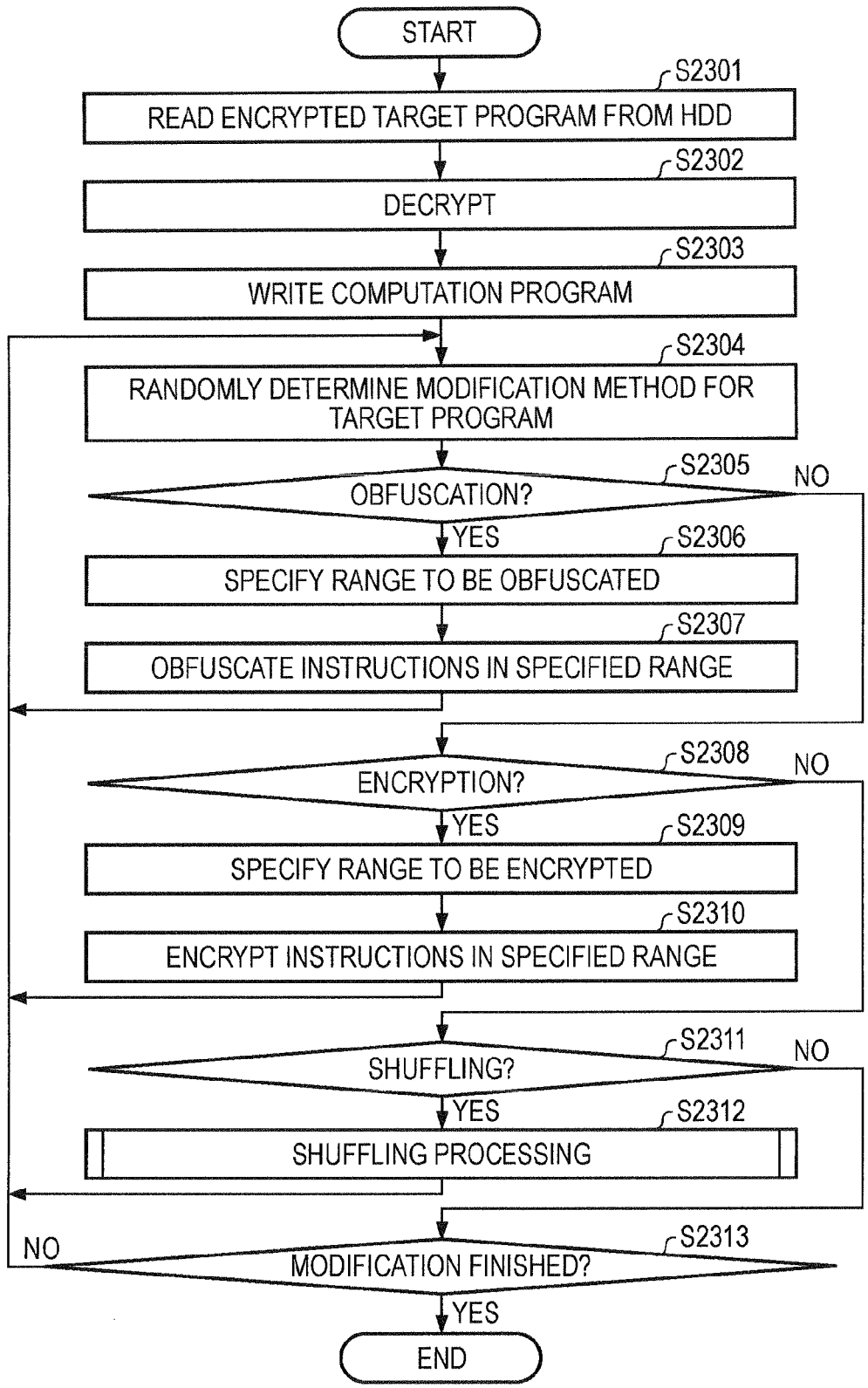
FIG. 23 illustrates an exemplary program modification.

FIG. 23 illustrates an exemplary program modification. The target program TP may be modified. In an operation S2301, the secure module 102 reads an encrypted target program E (TP) from the HDD 204. In an operation S2302, the secure module 102 decrypts the encrypted target program E (TP). For example, when the target program TP is not encrypted, the target program TP read from the HDD 204 may not be decrypted.

In an operation S2303, a computation program is written to the target program TP. In an operation S2304, the secure module 102 determines a modification method for the target program TP. The modification method may include "obfuscation", "encryption", "shuffling", or "doing nothing". The encryption may correspond to the encryption illustrated in FIG. 21. The shuffling may correspond to the shuffling illustrated in FIG. 20 or 21.

In an operation S2305, the secure module 102 determines whether or not the modification method is "obfuscation". When the modification method is "obfuscation", the process proceeds to an operation S2306 in which the secure module 102 specifies a range to be obfuscated in the target program TP. In an operation S2307, the secure module 102 obfuscates the instructions in the specified range. The process then returns to the operation S2304.

When the modification method is not "obfuscation", the process proceeds to an operation S2308 in which the secure module 102 determines whether or not the modification method is "encryption". When the modification method is "encryption", the process proceeds to an operation S2309 in which the secure module 102 specifies a range to be encrypted in the target program TP. In an operation S2310, the secure module 102 encrypts the instructions in the specified range. For example, as illustrated in FIG. 21, the secure module 102 stores, in the table, a combination of the address of an instruction to be encrypted and a decryption key with which the encrypted instruction at the address is encrypted. The process then returns to the operation S2304.

When the modification method is not "encryption", the process proceeds to an operation S2311 in which the secure module 102 determines whether or not the modification method is "shuffling". When the modification method is "shuffling", the process proceeds to an operation S2312 in which the secure module 102 performs shuffling, for example, as illustrated in FIG. 19. The process then returns to the operation S2304.

When the modification method is not "shuffling", the process proceeds to an operation S2313 in which the secure module 102 determines whether or not the modification is finished. For example, when the modification method is set to "doing nothing" and no modification has been performed, the modification is not finished. The process then returns to the operation S2304.

When the modification is performed at least once or a certain number of times, the modification is finished. The modified target program TP is written to the scan-target region 230 in the RAM 203.

FIG. 24 illustrates an exemplary one example of shuffling process. The shuffling process illustrated in FIG. 24 may correspond to the operation S2312 illustrated in FIG. 23. For example, the shuffling illustrated in FIG. 19 may be performed. In an operation S2401, the secure module 102 reserves a region in the secure module 102. In an operation S2402, the secure module 102 divides the target program TP into multiple instruction groups.

In an operation S2403, the secure module 102 sets a first one of the instruction groups as a target instruction group. In an operation S2404, the secure module 102 determines whether or not any instruction group subsequent to the target instruction group exits. When a subsequent instruction group exists, the process proceeds to an operation S2405 in which the secure module 102 randomly generates a program segment, for example, a Goto statement. For example, the secure module 102 reserves a region for the target instruction group.

In an operation S2406, the secure module 102 sets the address of the program segment to a next address of the last address of the target instruction group. In an operation S2407, the secure module 102 adds, to the table, a combination of the program segment and the write-destination address thereof.

In an operation S2408, the secure module 102 writes the read instruction of the program segment to the address allocated to the program segment of the target program TP. In an operation S2409, the secure module 102 sets, as the target instruction group, the subsequent instruction group at an address indicated by a program segment, for example, at address 8 indicated by a program segment "Goto 8". The process then returns to the operation S2404.

When it is determined in the operation S2404 that an instruction group subsequent to the target instruction group does not exist, the shuffling process ends. The process then returns to the operation S2304.

Since the target program TP is modified, cracking of the target program TP may be reduced. When an encrypted target program TP is read, the modification method may be changed for the modification process.

When the scanning program SP periodically or irregularly scans the scan-target region 230, the modifying program PP writes data and code to the scan-target region 230 before the scanning program SP is updated. Before the update, the modified scanning program SP scans the scan-target region 230 and it is checked whether or not the scanning program SP operates properly.

Figure 25A:
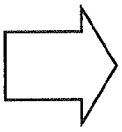
FIGS. 25A to 25C illustrate an exemplary program modification.
Figure 25B:
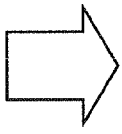
Figure 25C:
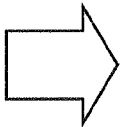

FIGS. 25A to 25C illustrate an exemplary program modification. The target program TP may be modified. In FIG. 25A, instructions corresponding to addresses 1 to 4 in the target program TP are obfuscated and NOP (no-operation instruction) is added to addresses 5 to 7. In FIG. 25B, the instructions corresponding to addresses 1 to 4 are not changed and instructions are added to addresses 5 to 7. In FIG. 25C, the instructions corresponding to addresses 1 to 4 are not changed and instructions are added to addresses 5 to 7. The result of the process illustrated in FIG. 25A, the result of the process illustrated in FIG. 25B, and the result of the process illustrated in FIG. 25C may be substantially the same.

After the target program TP illustrated at the left side in each of FIGS. 25A to 25C is scanned, the target program TP illustrated at the right side in each of FIGS. 25A to 25C is modified, and the modified target program TP is scanned before the update of the scanning program SP. As a result, the proper operation of the scanning program SP may be checked.

Figure 26:
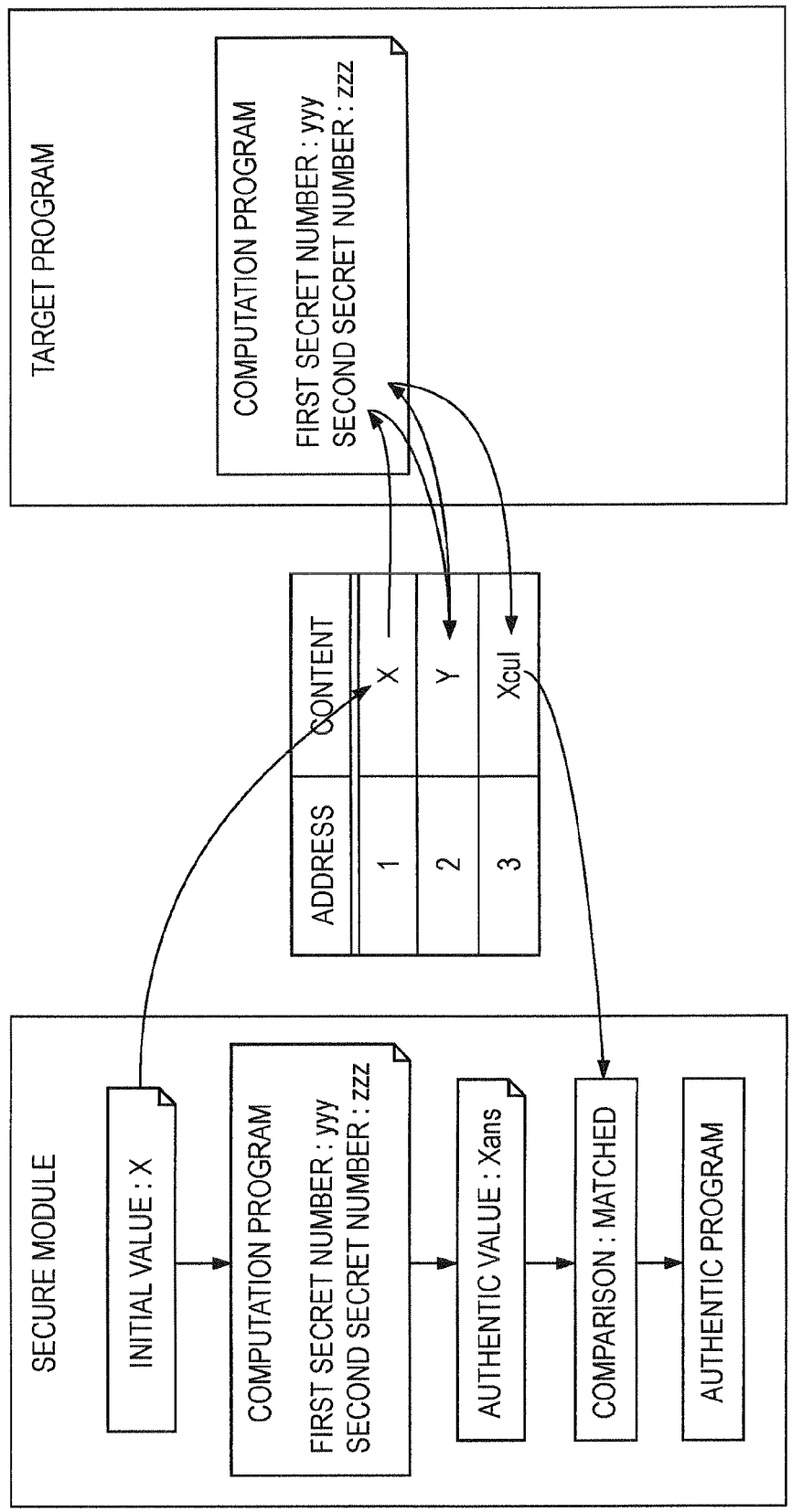
FIG. 26 illustrates an exemplary computation program.

FIG. 26 illustrates an exemplary computation program. The computation program illustrated in FIG. 26 may be included in the target program TP. The computation program determines a result of a certain computation. The secure module 102 may determine the authenticity of the target program TP based on the computation result of the computation program.

For example, the computation program may store, at memory location 2, a value obtained by multiplying a value at memory location 1 by a first secret number "yyy" and may store, at memory location 3, a value obtained by multiplying the value at memory location 2 by a second secret number "zzz".

The secure module 102 stores a generated value "X" at memory location 1. The secure module 102 determines an authentic value "Xans" by the computation program based on the value "X".

The target program TP reads "X" at memory location 1; stores, at memory location 2, a value "Y" obtained by multiplying "X" by the first secret number "yyy", and stores, at memory location 3, a value "Xcul" obtained by multiplying the value "Y" at memory location 2 by the second secret number "zzz".

For example, the secure module 102 periodically refers to the value at memory location 3 to read the value "Xcul" at memory location 3 and compares the value "Xcul" with the authentic value "Xans". When Xcul and Xans match each other within a certain amount of time after "X" is stored at memory location 1, the secure module 102 determines that the target program TP is an authentic program. When Xcul and Xans do not match each other within the certain period of time, the secure module 102 determines that the target program TP is an unauthentic program.

Figure 27:
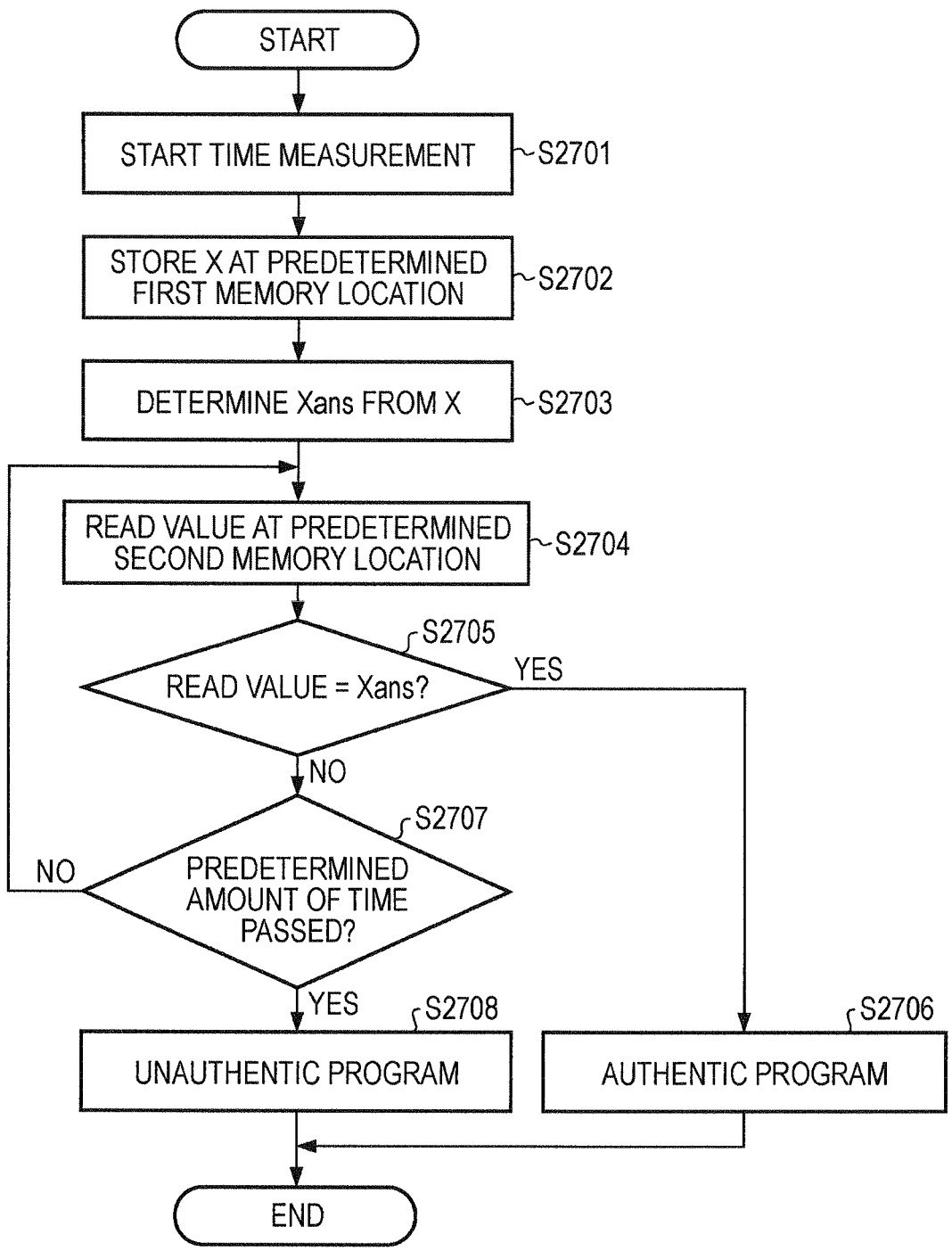
FIG. 27 illustrates an exemplary authentication process.

FIG. 27 illustrates an exemplary authentication process. The secure module 102 may perform authentication process illustrated in FIG. 27. In an operation S2701, the secure module 102 starts time measurement. In an operation S2702, the secure module 102 stores a generated value "X" at a certain first memory location. In an operation S2703, the computation program determines an authentic value "Xans" from the generated value "X".

In an operation S2704, the secure module 102 reads a value at a second memory location. In an operation S2705, the secure module 102 determines whether or not the read value matches Xans. When the read value matches Xans, the process proceeds to an operation S2706 in which the secure module 102 determines that the target program TP is an authentic program and then the authentication process ends.

When the read value does not match Xans, the process proceeds to an operation S2707 in which the secure module 102 determines whether or not a certain amount of time has passed from the start of the time measurement in the operation S2701. When the certain amount of time has not passed, the process returns to the operation S2704.

When the certain amount of time has passed, the process proceeds to an operation S2708 in which the secure module 102 determines that the target program TP is an unauthentic program. Thereafter, the authentication process may end. The details of the authentication process, for example, the computation program, may be changed each time it is executed. Each time the encrypted target program TP is read, the computation program in the target program TP may be changed. Thus, crackers' cracking process, for example, analysis of the computation program and impersonation, may be reduced.

Figure 28:
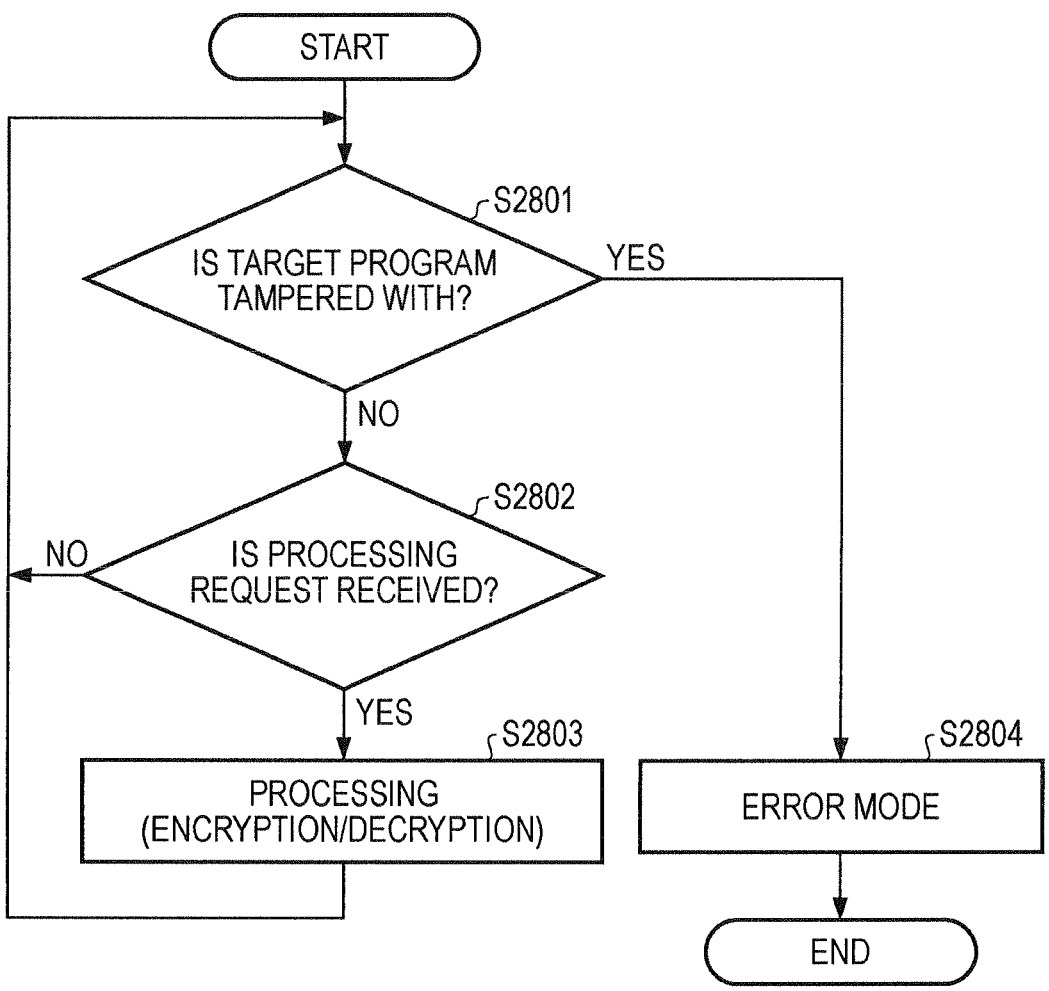
FIG. 28 illustrates an exemplary encryption permission process.

FIG. 28 illustrates an exemplary encryption permission process. The secure module 102 may perform encryption permission illustrated in FIG. 28. In an operation S2801, the secure module 102 determines whether or not the target program TP is tampered with.

When the target program TP is not tampered with, the process proceeds to an operation S2802 in which the secure module 102 determines whether or not a processing request is received from the target program TP.

When a processing request is received from the target program TP, the process proceeds to an operation S2803 in which the secure module 102 performs process based on the processing request received from the target program TP and then the process returns to the operation S2801. When no processing request is received in operation S2802, the process returns to the operation S2801.

When it is determined in the operation S2801 that the target program TP is tampered with, the process proceeds to an operation S2804 in which the secure module 102 may enter an error mode and then the authentication permission process may end. In the error mode, when the target program TP is not restarted, the secure module 102 may reject a request from the target program TP.

Figure 29:
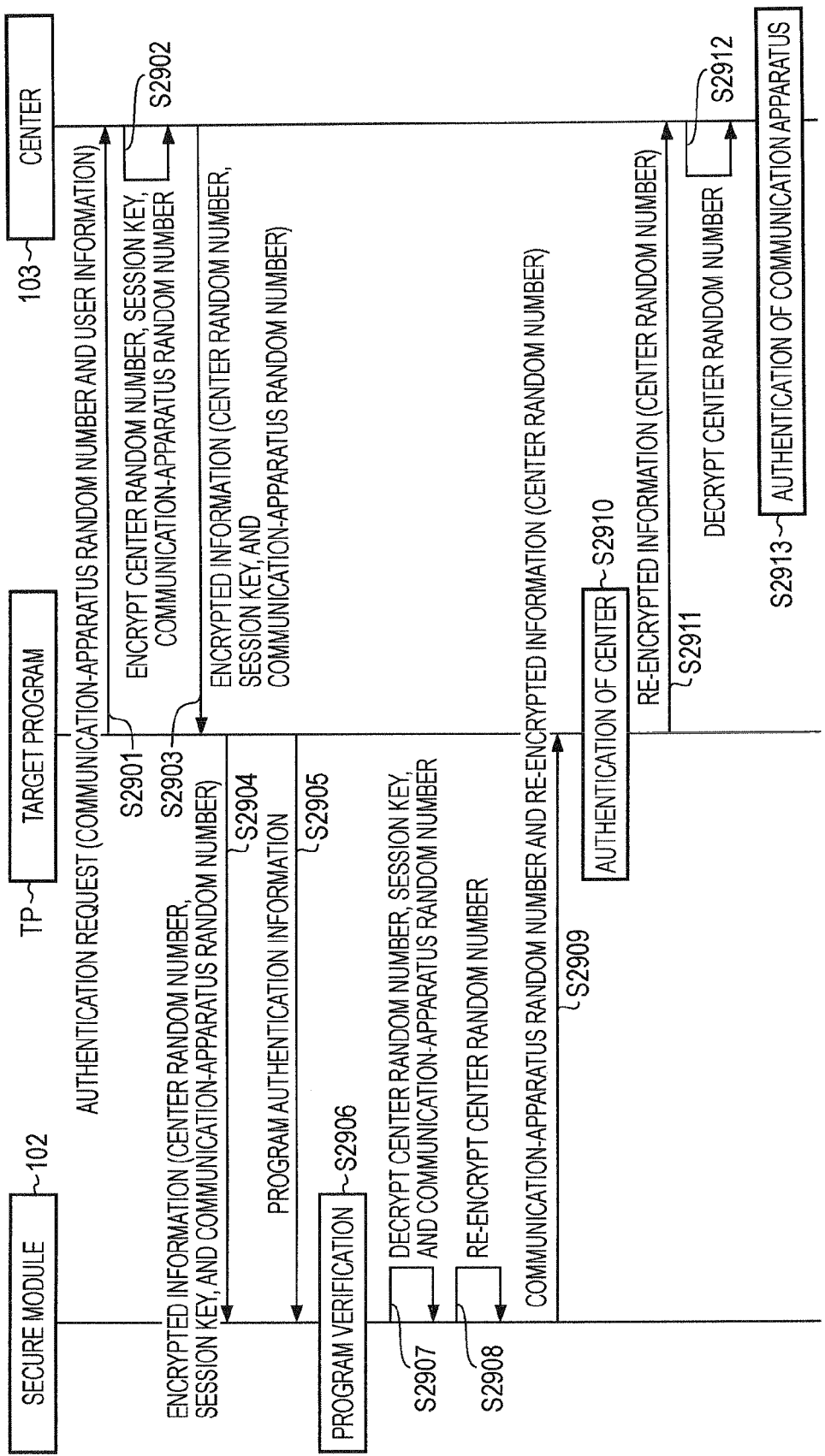
FIG. 29 illustrates an exemplary authentication sequence.
Figure 30:
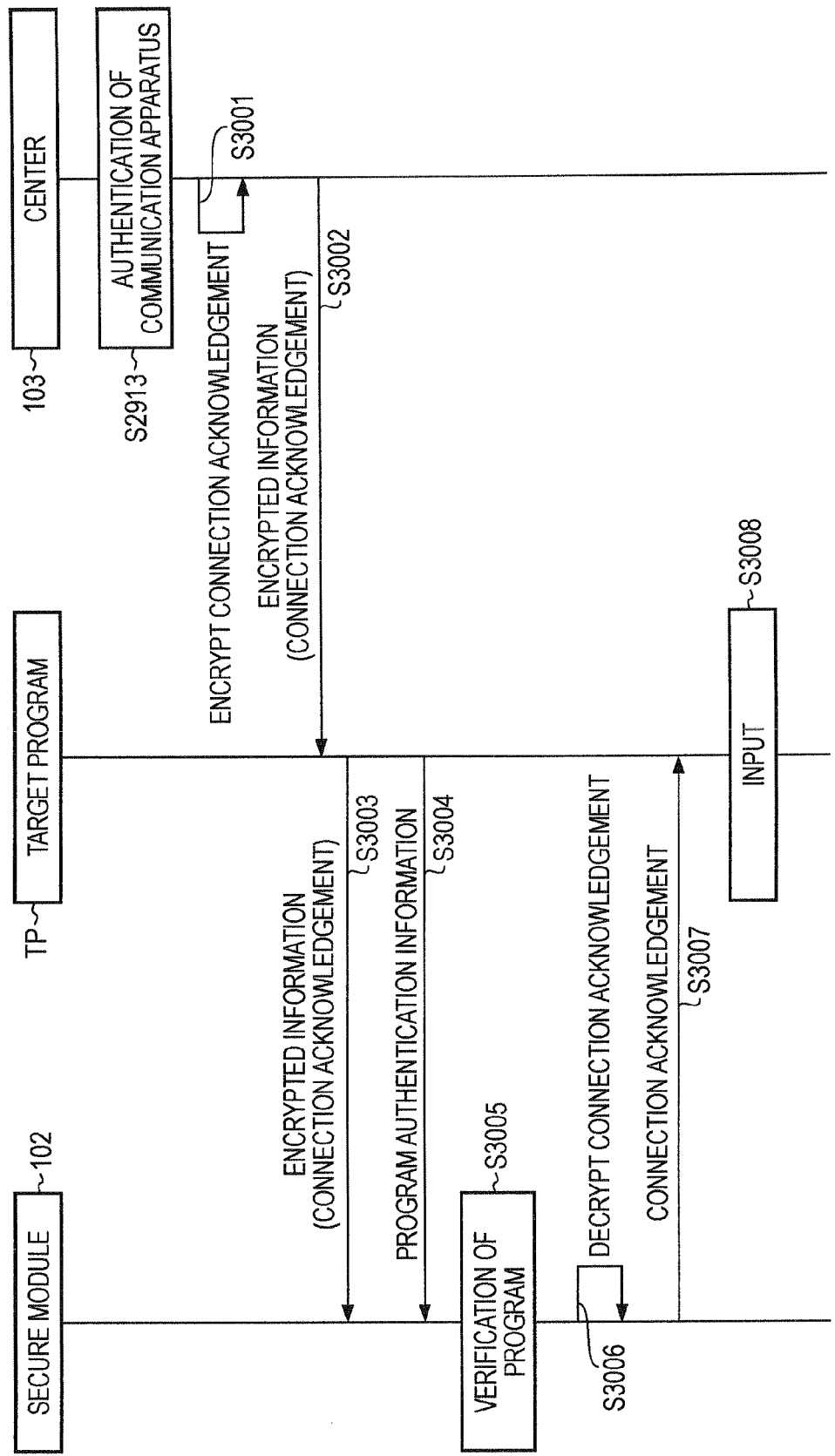
FIG. 30 illustrates an exemplary authentication sequence.

FIGS. 29 and 30 illustrate an exemplary authentication sequence. In FIGS. 29 and 30, the communication apparatus 101 and the center 103 may mutually verify whether or not the apparatuses with which they are communicating are authentic apparatuses.

FIG. 29 illustrates an exemplary mutual authentication between a communication apparatus and a center. The secure module 102 holds the public key of the center 103 and the secret key of the secure module 102. The center 103 holds the public key of the secure module 102 and the secret key of the center 103. The secure module 102 and the center 103 may hold a common key.

In an operation S2901 in FIG. 29, the target program TP transmits an authentication request including a generated communication-apparatus random number and user information to the center 103.

Upon reception of the authentication request, in an operation S2902, the center 103 uses the secret key thereof to encrypt the center random number generated at the center 103, a session key (e.g., a temporary key) generated at the center 103, and the communication-apparatus random number included in the received authentication request. In an operation S2903, the center 103 transmits the encrypted center random number, the encrypted session key, and the encrypted communication-apparatus random number to the target program TP.

Upon reception of the encrypted center random number, the encrypted session key, and the encrypted communication-apparatus random number, in an operation S2904, the target program TP sends a decryption request including the encrypted center random number, the encrypted session key, and the encrypted communication-apparatus random number to the secure module 102. Upon reception of the decryption request, in an operation S2905, the secure module 102 obtains program authentication information from the target program TP. In an operation S2906, the secure module 102 verifies the authenticity of the target program TP based on the obtained program authentication information.

In an operation S2907, the secure module 102 uses the public key of the center 103 to decrypt the center random number, the session key, and the communication-apparatus random number. The secure module 102 holds the decrypted session key. In an operation S2908, the secure module 102 uses the secret key of the secure module 102 to re-encrypt the decrypted center random number. In an operation S2909, the secure module 102 transmits the decrypted communication-apparatus random number and the re-encrypted center random number to the target program TP.

Upon receiving the decrypted communication-apparatus random number and the re-encrypted center random number, the target program TP determines whether or not the received communication-apparatus random number decrypted by the secure module 102 and the communication-apparatus random number transmitted in the operation S2901 match each other. When the communication-apparatus random numbers match each other, the process proceeds to an operation S2910 in which the target program TP determines that it is coupled to the authentic center 103. In an operation S2911, the target program TP transmits the re-encrypted center random number to the center 103.

In an operation S2912, the center 103 decrypts the received re-encrypted center random number. The center 103 then determines whether or not the decrypted center random number and the center random number transmitted in the operation S2903 match each other. When the center random numbers match each other, the process proceeds to an operation S2913 in which the center 103 verifies that it is coupled to the authentic target program TP. Thereafter, the process proceeds to an operation S3001 illustrated in FIG. 30.

FIG. 30 illustrates an exemplary mutual authentication. The mutual authentication may be preformed between the communication apparatus 101 and the center 103. As illustrated in FIG. 30, in an operation S3001, the center 103 that has verified the target program TP uses the session key to encrypt a connection acknowledgement. In an operation S3002, the center 103 transmits the encrypted connection acknowledgement to the target program TP.

Upon reception of the encrypted connection acknowledgement, in an operation S3003, the target program TP transmits a decryption request including the encrypted connection acknowledgement to the secure module 102. Upon reception of the decryption request, in an operation S3004, the secure module 102 obtains program authentication information from the target program TP. In an operation S3005, the secure module 102 verifies the authenticity of the target program TP based on the obtained program authentication information.

In an operation S3006, the secure module 102 uses the session key of the center 103 to decrypt the connection acknowledgement from the decryption request. In an operation S3007, the secure module 102 transmits the decrypted connection acknowledgement to the target program TP.

Upon reception of the connection acknowledgement, in an operation S3008, the target program TP determines that the mutual connection with the center 103 is completed and enters a state in which the target program TP waits for an input from the user.

Since the communication apparatus 101 and the center 103 transmit the respective random numbers during the mutual authentication, a replay attack may be reduced. When the mutual authentication is performed multiple times, a series of encrypted signals varies based on the transmitted random numbers.

This arrangement reduces crackers' impersonating a legitimate user of the communication apparatus 101 by transmitting the same series of signals to the center 103. The function of generating the random number may also be secure.

After the communication apparatus 101 and the center 103 mutually verify that the apparatuses with which they are communicating are authentic apparatuses, the communication apparatus 101 transmits/receives data based on the target program TP.

FIG. 31 illustrates an exemplary mutual authentication. The mutual authentication may be preformed between the communication apparatus 101 and the center 103. In FIG. 31, the communication apparatus 101 and the center 103 perform encrypted communication with each other. For example, the user may input, to the target program TP, purchase information including a book to be purchased and a delivery address.

As illustrated in FIG. 31, in an operation S3101, the target program TP receives the purchase information input by the user and transmits an encryption request for the purchase information to the secure module 102. Upon reception of the encryption request, in an operation S3102, the secure module 102 obtains program authentication information from the target program TP. In an operation S3103, the secure module 102 verifies the authenticity of the target program TP based on the obtained program authentication information.

In an operation S3104, the secure module 102 that has received the purchase information uses the session key of the secure module 102 to encrypt the purchase information. In an operation S3105, the secure module 102 transmits the encrypted purchase information to the target program TP. Upon reception of the encrypted purchase information, in an operation S3106, the target program TP transmits the encrypted purchase information to the center 103.

Upon reception of the encrypted purchase information, in an operation S3107, the center 103 uses the session key of the center 103 to decrypt the purchase information. In an operation S3108, the center 103 sells the corresponding goods based on the decrypted purchase information.

Since the secure module 102 encrypts the purchase information after checking whether or not the target program TP is an authentic program, transmission of fake purchase information to the center 103 is reduced.

FIG. 32 illustrates an exemplary mutual authentication. The mutual authentication may be preformed between the communication apparatus 101 and the center 103. In FIG. 32, the communication apparatus 101 and the center 103 may perform encrypted communication of program code with each other. For example, the user may input a service identification number of a desired software service to the target program TP.

As illustrated in FIG. 32, in an operation S3201, the target program TP receives the service identification information from the user and then transmits an encryption request for the service identification information to the secure module 102. Upon reception of the encryption request, in an operation S3202, the secure module 102 obtains program authentication information from the target program TP. In an operation S3203, the secure module 102 verifies the authenticity of the target program TP based on the obtained program authentication information.

In an operation S3204, the secure module 102 that has received the service identification number uses the session key of the secure module 102 to encrypt the service identification number. In an operation S3205, the secure module 102 transmits the encrypted service identification number to the target program TP. Upon reception of the encrypted service identification number, in an operation S3206, the target program TP transmits the encrypted service identification number to the center 103.

Upon reception of the encrypted service identification number, in an operation S3207, the center 103 uses the session key of the center 103 to decrypt the service identification number. The center 103 uses the session key of the center 103 to encrypt the decrypted service identification number and program code corresponding to the service identification number. In an operation S3208, the center 103 transmits the encrypted service identification number and the program code to the target program TP. Thereafter, the process proceeds to an operation S3301 illustrated in FIG. 33.

FIG. 33 illustrates an exemplary sequence of encrypted communication. In FIG. 33, the communication apparatus 101 and the center 103 may perform encrypted communication of the program code with each other. In the operation S3301, the target program TP transmits a decryption request including the received encrypted service identification number and the program code to the secure module 102. Upon reception of the decryption request, in operation S3302, the secure module 102 obtains program authentication information from the target program TP. In an operation S3303, the secure module 102 verifies the authenticity of the target program TP based on the obtained program authentication information.

In an operation S3304, the secure module 102 that has received the encrypted service identification number and the program code uses the session key of the secure module 102 to decrypt the service identification number and the program code. In an operation S3305, the secure module 102 uses a randomly generated key to re-encrypt the decrypted program code.

In an operation S3306, the secure module 102 transmits the service identification number and the re-encrypted program code to the target program TP. In an operation S3307, the secure module 102 stores the randomly generated cryptographic key and the service identification number in association with each other. In an operation S3308, the target program TP stores the received service identification number and the re-encrypted program code in association with each other.

Since the secure module 102 encrypts the service identification information after checking whether or not the target program TP is an authentic program, transmission of a fake service identification number to the center 103 is reduced. Since the secure module 102 re-encrypts the program code, transmitted from the center 103, to manage the decryption key for the program code in a secure manner, tampering of the program code is reduced.

Since the scanning program SP in the secure module 102 whose integrity is ensured detects tampering, cracking the scanning program SP is reduced.

When the scanning program SP in the communication apparatus 101 detects tampering, the secure module 102 randomly updates the scanning program SP in the communication apparatus 101. Crackers' cracking the scanning program SP may be reduced.

The secure module 102 may update the scanning program SP by performing "obfuscation", "change of the scan-target region", "change of the order of scan-target addresses", "addition of a scan computation result", or "addition of the address of the scanning program". Crackers' deciphering or tampering with the scanning program SP may be reduced.

Since the secure module 102 modifies the target program TP, crackers' cracking the target program TP may be reduced. For example, the secure module 102 may modify the target program TP by performing obfuscation, encryption, or shuffling. As a result of the modification, crackers' deciphering or tampering with the target program TP may be reduced.

When tampering is detected, the secure module 102 may stop the cryptographic unit 608, the output unit 609, or all functions. Since no process is performed on a cryptographic-key K read request and a communication-content encryption request issued from the target program TP from which the tampering is detected, the target program TP from which the tampering is detected does not perform encrypted communication using the cryptographic key K.

Based on the time interval between when a request is output to the communication apparatus 101 and when a response to the request is obtained, the secure module 102 estimates a physical distance between the secure module 102 and the response transmission source. The secure module 102 determines that the cracker's computer 104 is impersonating a legitimate user of the communication apparatus 101.

Since the secure module 102 encrypts data received from or data to be sent to the target program TP in the communication apparatus 101, cracking the data on a communication channel between the secure module 102 and the processor 301 in the communication apparatus 101 may be reduced.

Example embodiments of the present invention have now been described in accordance with the above advantages. It will be appreciated that these examples are merely illustrative of the invention. Many variations and modifications will be apparent to those skilled in the art.

The invention claimed is:

1. A communication apparatus, comprising:
a first processor;
a secure module including a second processor; and
a first memory, coupled to the first processor via a bus and provided outside the secure module, to store a first program to be executed by the first processor for an encrypted communication with an apparatus external to the communication apparatus using a cryptographic key stored in the secure module,
wherein the second processor, based on a second program, performs operations to:
detect a tampering of the first program;
disable the encrypted communication which is performed by the first processor in executing the first program when the tampering of the first program is detected;
generate a first scanning program for generating a first code which is used for detecting the tampering of the first program; and
update the first scanning program to generate a second scanning program for generating a second code which is used for detecting the tampering of the first program,
wherein the operation to disable the encrypted communication includes rejecting one of a cryptographic-key read request and a communication-content encryption request issued from the first program.

2. The communication apparatus according to claim 1, further comprising;
a second memory, provided in the secure module, to store a third code corresponding to the first program, and
detects the tampering of the first program based on the first code and the third code.

3. The communication apparatus according to claim 2, wherein the second processor obfuscates an instruction of the first scanning program.

4. The communication apparatus according to claim 2, wherein the second processor changes a scan-target address specified by the first scanning program.

5. The communication apparatus according to claim 2, wherein the second processor changes an order of scan-target addresses specified by corresponding instructions in the first scanning program.

6. The communication apparatus according to claim 2, wherein the second processor changes a content of a computation instruction based on data specified by an instruction in the first scanning program, stores a result of computation according to the changed computation instruction in the first memory and adds an instruction for returning the result of the computation to the secure module.

7. The communication apparatus according to claim 2, wherein the second processor changes an instruction in the first scanning program to an instruction depending on an address at which the first scanning program is stored in the communication apparatus.

8. The communication apparatus according to claim 2, wherein the third code is substantially the same as the first code and the second scanning program includes a description that is different from a description of the first scanning program.

9. The communication apparatus according to claim 2, wherein, when the second processor generates the second scanning program by uprating the first scan program, the second processor overwrites the third core in the second memory with the second code.

10. The communication apparatus according to claim 1, wherein the second processor modifies the first program into a program code having a different description and having substantially the same function and to write a code corresponding to the program code in the first memory, and detects a tampering of the program code based on a validity of a result of computation in the program code.

11. The communication apparatus according to claim 10, wherein the second processor obfuscates an instruction of the program.

12. The communication apparatus according to claim 10, wherein the second processor shuffles instructions of the program;
stores, in the second memory, a table specifying a combination of a jump instruction specifying an address of a jump-destination instruction and an address of the jump instruction;
changes a content of the jump instruction to a read instruction for the table; and
writes the read instruction in the first memory.

13. The communication apparatus according to claim 10, wherein the second processor shuffles instructions of the first program;
stores, in the second memory, a table specifying a combination of a jump instruction specifying an address of a jump-destination instruction, a jump-source instruction, and an address of the jump-source instruction;
changes content of the jump-source instruction to a read instruction for the table; and
writes the read instruction to in the first memory.

14. The communication apparatus according to claim 10, wherein the second processor replaces an arbitrary instruction of the program with an encrypted instruction resulting from encryption of the arbitrary instruction, a read instruction for the secure module, and a decryption instruction for decrypting the encrypted instruction;
stores, in the second memory, a table specifying a combination of the address of the read instruction and a decryption key for decrypting the encrypted instruction; and
writes the replaced program in the first memory.

15. The communication apparatus according to claim 10, wherein the second processor replaces an arbitrary instruction of the program with a read instruction for the secure module;
stores, in the second memory, a table specifying a combination of the address of the read instruction and the arbitrary instruction; and
writes the replaced program in the first memory.

16. The communication apparatus according to claim 1, wherein the second processor determines, when not detecting the tampering of the first program, whether or not an amount of time from when a request is output to the first processor to when a response is obtained from the second processor is longer than or equal to a certain amount of time.

17. The communication apparatus according to claim 1, wherein the second processor obtains data to be transmitted from the first program to the external apparatus prior to the transmission of the data; and encrypts the data by using the cryptographic key.

18. The communication apparatus according to claim 1, wherein the second processor obtains a request for outputting the cryptographic key from the first program; and outputs the cryptographic key to the first program when obtaining the request.

19. The communication apparatus according to claim 1, wherein the cryptographic key is a secret key of the secure module, the secret key corresponding to a public key of the external apparatus.

20. The communication apparatus according to claim 1, wherein an update by the second processor is performed periodically or irregularly.

21. A secure module,
wherein the secure module is provided in a communication apparatus including a first processor and a first memory, which is coupled to the first processor via a bus, is provided outside the secure module and stores a first program to be executed by the first processor, has data not being externally referred to, and includes:
a second memory to store a second program; and
a second processor to execute the second program to performs operations, the operations include:
detecting a tampering of the first program for performing an encrypted communication with an apparatus external to the communication apparatus by using a cryptographic key in the secure module;
putting the first processor into a state in which the first program is incapable of performing the encrypted communication using the cryptographic key, when detecting the tampering of the first program;
generating a first scanning program for generating a first code which is used for detecting the tampering of the first program; and
updating the first scanning program to generate a second scanning program for generating a second code which is used for detecting the tampering of the first program,
wherein the state includes rejecting one of a cryptographic-key read request and a communication-content encryption request issued from the first program.

22. The secure module according to claim 21, wherein the updating is performed periodically or irregularly.

* * * * *